United States Patent
Tanishima et al.

(10) Patent No.: US 10,381,026 B2
(45) Date of Patent: Aug. 13, 2019

(54) RECORD PLAYER

(71) Applicants: TEAC CORPORATION, Tama-shi, Tokyo (JP); Prospine Co., Ltd., Osaki, Miyagi-pref. (JP)

(72) Inventors: Takao Tanishima, Tokyo (JP); Hidetoshi Konno, Osaki (JP)

(73) Assignees: TEAC CORPORATION, Tokyo (JP); PROSPINE CO., LTD., Miyagi (JP)

( * ) Notice: Subject to any disclaimer, the term of this patent is extended or adjusted under 35 U.S.C. 154(b) by 0 days.

(21) Appl. No.: 16/030,191

(22) Filed: Jul. 9, 2018

(65) Prior Publication Data

US 2019/0013040 A1 Jan. 10, 2019

(30) Foreign Application Priority Data

Jul. 10, 2017 (JP) .................................. 2017-134923

(51) Int. Cl.
 *G11B 3/60* (2006.01)
 *H02K 49/10* (2006.01)
 *G11B 19/20* (2006.01)
 *G11B 3/02* (2006.01)

(52) U.S. Cl.
 CPC ............ *G11B 3/60* (2013.01); *G11B 19/2009* (2013.01); *H02K 49/102* (2013.01); *G11B 3/02* (2013.01)

(58) Field of Classification Search
 None
 See application file for complete search history.

(56) References Cited

U.S. PATENT DOCUMENTS

| 3,909,643 | A | * | 9/1975 | Kishima | G11B 19/2009 310/156.05 |
| 3,988,024 | A | * | 10/1976 | Watanabe | G11B 15/32 369/266 |
| 4,131,828 | A | * | 12/1978 | Houshi | G11B 19/2009 318/400.2 |
| 4,194,743 | A | * | 3/1980 | Ohsawa | G11B 19/022 310/268 |

FOREIGN PATENT DOCUMENTS

| FR | 2214191 | A1 | * | 8/1974 | ............. G11B 19/20 |
| FR | 2466075 | A1 | * | 3/1981 | ............. G11B 19/20 |
| JP | 49-14107 | A |   | 2/1974 | |
| JP | 51117004 | A | * | 10/1976 | ............. G11B 19/20 |
| JP | 55153174 | A | * | 11/1980 | ............. G11B 19/28 |
| JP | 61066560 | A | * | 4/1986 | ............. G11B 19/20 |

(Continued)

OTHER PUBLICATIONS

Yamamoto, Teijiro, "Rotation Transmitting Device," published Sep. 14, 2001, JP 2001-251844A (Year: 2001).*

*Primary Examiner* — William J Klimowicz
(74) *Attorney, Agent, or Firm* — Seed IP Law Group LLP

(57) ABSTRACT

A record player includes a turntable, a drive motor, a non-contact transmission mechanism, a tone arm, and a housing. The non-contact transmission mechanism includes a drive-side rotor and a magnetic member. The drive-side rotor is rotated by a driving force of the drive motor. The drive-side rotor is formed of a permanent magnet. The magnetic member is constituted of a soft magnetic body. The turntable is rotated according to the rotation of the drive-side rotor by an attraction force acting on the magnetic member from the permanent magnet.

12 Claims, 21 Drawing Sheets

(56) References Cited

FOREIGN PATENT DOCUMENTS

| | | | | |
|---|---|---|---|---|
| JP | 61129771 A | * | 6/1986 | ............. G11B 19/20 |
| JP | 61142566 A | * | 6/1986 | |
| JP | 2001-251844 A | | 9/2001 | |
| JP | 2004-95075 A | | 3/2004 | |
| JP | 2005-083487 A | | 3/2005 | |
| SU | 1408498 A1 | * | 7/1988 | |

* cited by examiner

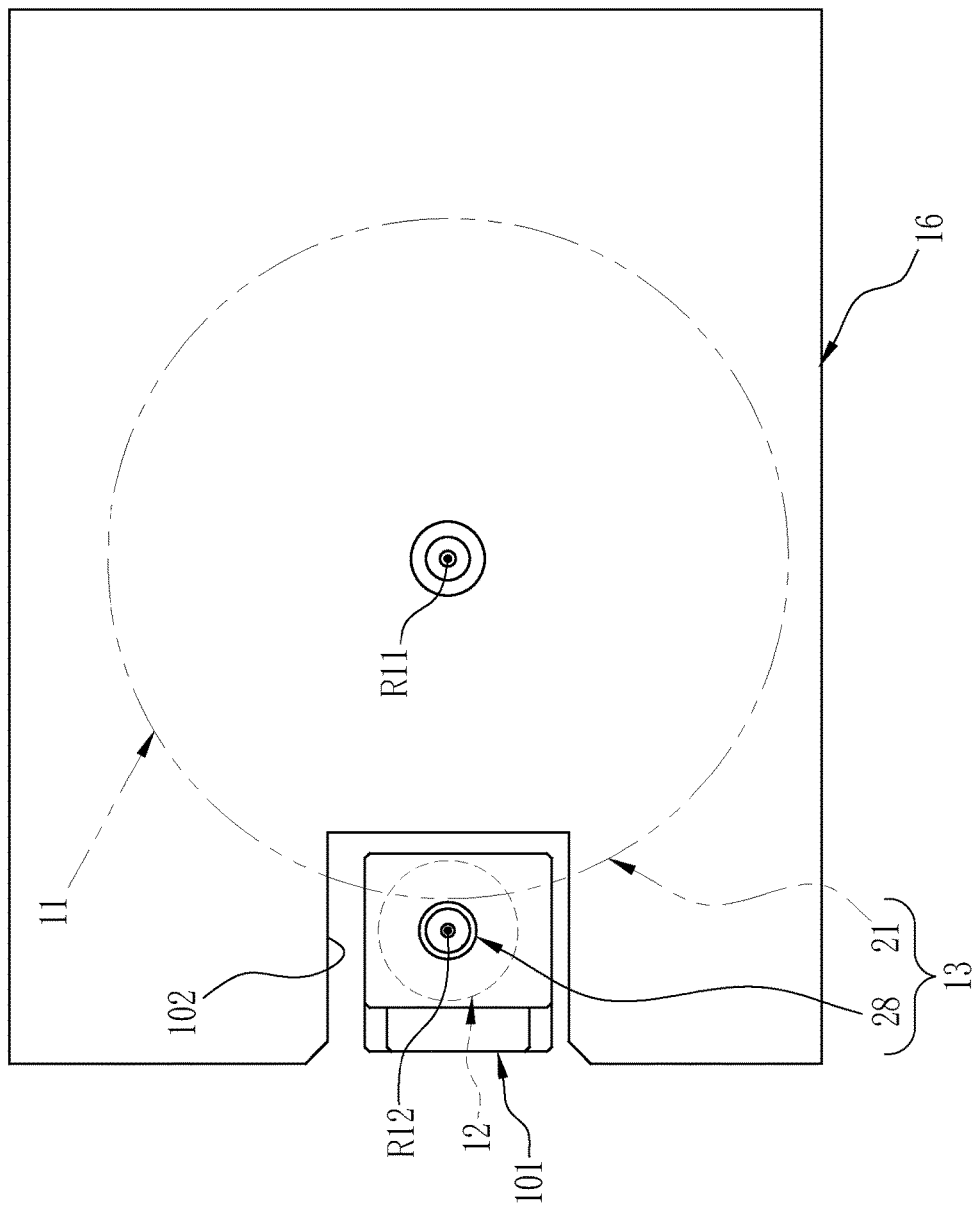

RECORD PLAYER

CROSS-REFERENCE TO RELATED APPLICATION

This application claims priority under 35 USC 119 from Japanese Patent Application No. 2017-134923, filed 10 Jul. 2017, the disclosure of which is incorporated by reference herein.

BACKGROUND

Technical Field

The present application relates to a record player.

Description of the Related Art

Conventionally, as a driving force transmission mechanism for rotating a turntable of a record player, a belt drive system and a direct drive system are known. In the belt drive system, a rotational force is transmitted through a belt hung between a drive motor and the turntable. In the direct drive system, a drive motor is coaxial with the turntable and a drive shaft of the drive motor is rigidly coupled to the turntable, so that the drive motor directly transmits a rotational force to the turntable.

By the way, although it is not a driving force transmission mechanism for a turntable, a non-contact transmission mechanism as a driving force transmission mechanism is known. The non-contact transmission mechanism transmits a rotational force of a drive motor from a drive-side rotor to a driven-side rotor in a non-contact manner by a magnetic force (refer to JP2005-083487A and JP2001-251844A). JP2005-083487A uses magnetic disk plates (ferromagnetic body) in which N poles and S poles are alternately multipole-magnetized along the circumferential portion, as the drive-side rotor and the driven-side rotor. JP2001-251844A includes a drive-side rotor using a multipolar magnet in which N poles and S poles are alternately arranged and a driven-side rotor using a ferromagnetic body at least in part.

BRIEF SUMMARY

In case that vibration generated by the drive motor is transmitted to the turntable, it will adversely affect a quality of reproduction of a record. In the driving force transmission mechanism of the belt drive system and the direct drive system, since the rotational force of the drive motor is transmitted by mechanical coupling, it cannot be avoided that the vibration of the drive motor is transmitted to the turntable. Therefore, the inventors are considering adopting a non-contact transmission mechanism such as described in JP2005-083487A and JP2001-251844A as the transmission mechanism for transmitting the rotational force of the drive motor to the turntable.

Also, many users of audio equipment such as a record player not only pursue high sound quality but also visually enjoy a high quality appearance and a special mechanism of the audio equipment. The inventors have a desire to incorporate a non-contact transmission mechanism in a record player so that this mechanism can be visually recognized from outside in accordance with such the user's preference.

However, there is a following problem to incorporate a non-contact transmission mechanism such as described in JP2005-083487A and JP2001-251844A into a record player while satisfying such the demand of the inventors. That is, in the driving force transmission mechanisms described in JP2005-083487A and JP2001-251844A, a ferromagnetic body is used for the driven-side rotor. A ferromagnetic body always holds a magnetic force.

In order to make the non-contact transmission mechanism visible from outside, it is preferable to arrange the ferromagnetic body near the outer periphery of the turntable. However, in case that the ferromagnetic body is arranged near the outer periphery of the turntable, since the ferromagnetic body is placed near a user, there is a concern that the magnetism may adversely affect the user and so on. As an object to be adversely affected, for example, there may be a magnetic card such as a credit card which holds magnetic information, or an analog timepiece held by the user.

In addition, a cartridge functioning as the pickup mechanism of the record player has a stylus, coils, and a permanent magnet, and has a configuration to convert the stylus's vibration into electric signals with the coils and the permanent magnet and output the electric signals. Therefore, in case that there is a ferromagnetic body that always holds a magnetic force in the vicinity of the cartridge, there is a concern that the signal conversion of the cartridge may be adversely affected.

An object of the present application is to provide a record player equipped with a non-contact transmission mechanism which makes it easy to visually recognize a state of non-contact driving from outside and has little adverse effect by magnetism to users and so on.

In order to achieve the above object, a record player of the present application has a turntable, a drive motor, and a non-contact transmission mechanism. The non-contact transmission mechanism has a drive-side rotor and a magnetic member, and it rotates the turntable according to the rotation of the drive-side rotor by an attraction force acting on the magnetic member from the permanent magnet. A record is placed on the turntable. The drive motor generates a driving force to rotate the turntable. The non-contact transmission mechanism transmits the driving force of the drive motor to the turntable in a non-contact manner by a magnetic force. The drive-side rotor has a permanent magnet that generates the magnetic force and is rotated by the driving force of the drive motor. The magnetic member is provided on the entire circumference of the outer peripheral portion of the turntable in a state of partially opposing the permanent magnet, so that an attraction force due to the magnetic force from the permanent magnet acts on the magnetic member. The magnetic member is constituted of a soft magnetic body which has the characteristic that it is magnetized only while it is in the magnetic field of the permanent magnet and has no magnetic force after leaving the magnetic field.

It is preferable that the permanent magnet has N poles and S poles which are alternately arranged in the circumferential direction at equal intervals on the drive-side rotor, and the magnetic member is constituted by alternately arranging first portions and second portions at equal intervals in the circumferential direction on the turntable. In the first portion, the influence of the magnetic force from the permanent magnet is relatively large. In the second portion, the influence of the magnetic force from the permanent magnet is relatively small.

It is preferable that the first portion is a projection portion projecting from the magnetic member toward the permanent magnet where the magnetic member and the permanent magnet are facing, the second portion is a recessed portion recessed in the direction in which the distance from the magnetic member to the permanent magnet becomes greater than that at the projection portion, and an interval of each of the projection portions of the magnetic member is defined so that one of the two adjacent projection portions sandwiching one of the recessed portions faces the N pole and the other faces the S pole adjacent to the N pole where the magnetic member and the permanent magnet are facing.

It is preferable that the magnetic member is an annular body formed along an outer circumference of the turntable and having a plurality of opening portions at equal intervals in the circumferential direction, the second portion is an opening portion and the first portion is a peripheral surface portion connecting the adjacent opening portions in the annular body, and an interval of each of the peripheral surface portions of the annular body is defined so that each one of the two adjacent peripheral surface portions sandwiching one of the opening portions faces the border of the N pole and the S pole where the magnetic member and the permanent magnet are facing.

It is preferable that the magnetic member is provided on a side face of the outer peripheral portion of the turntable which is parallel to a rotation axis of the turntable, the permanent magnet is provided on a side face of the outer peripheral portion of the drive-side rotor which is parallel to a rotation axis of the drive-side rotor, and the turntable and the drive-side rotor are arranged with their respective rotation axes in a parallel state and their side faces opposed to each other.

It is preferable that the magnetic member is provided on a plane of the outer peripheral portion of the turntable which is perpendicular to a rotation axis of the turntable, the permanent magnet is provided on a plane of the outer peripheral portion of the drive-side rotor which is perpendicular to a rotation axis of the drive-side rotor, and the turntable and the drive-side rotor are arranged with their respective rotation axes in a parallel state and their planes opposed to each other.

It is preferable that the soft magnetic body is electromagnetic pure iron or ferrosilicon.

It is preferable to provide a housing to which the turntable and the drive-side rotor are rotatably mounted. It is preferable that the drive-side rotor is arranged on a rear side from the rotation axis of the turntable as viewed from a front face of the housing.

It is preferable that a tone arm is arranged on a side from the turntable in the housing, and the drive-side rotor is arranged on the opposite side to the tone arm across the turntable.

It is preferable that a lower portion of the turntable is embedded inside the housing, the magnetic member is provided on the lower portion, the drive-side rotor is arranged in the housing so as to face the lower portion, and the housing is provided with a transparent plate through which a portion where the drive-side rotor and the magnetic member face each other is visually recognized.

It is preferable to provide a shielding member which covers the periphery of the drive-side rotor and shields the magnetic force.

According to the present application, since a magnetic member constituted of a soft magnetic body is provided on an outer peripheral portion of a turntable, it can provide a record player equipped with a non-contact transmission mechanism which makes it easy to visually recognize a state of non-contact driving from outside and has little adverse effect by magnetism to users.

BRIEF DESCRIPTION OF THE SEVERAL
VIEWS OF THE DRAWINGS

FIG. 20 is a top view of the variation in which the holding member holding the drive motor is provided separately from the housing.

DETAILED DESCRIPTION

First Embodiment

Figure 1:
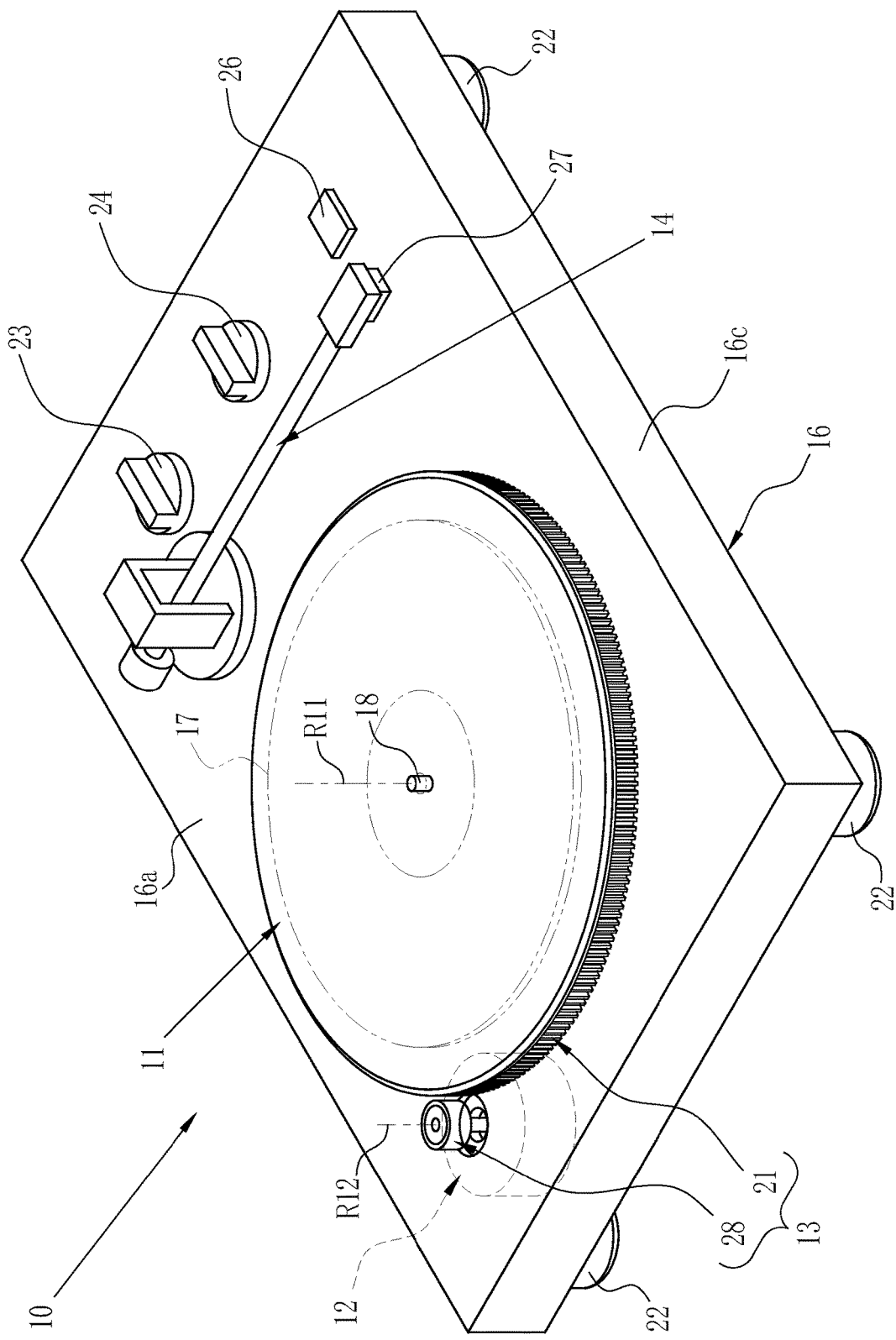
FIG. 1 is a perspective view of a record player of the present application.

[Schematic Configuration of Record Player]
As shown in FIG. 1, a record player 10 includes a turntable 11, a drive motor 12, a non-contact transmission mechanism 13, a tone arm 14, and a housing 16. The turntable 11 and the tone arm 14 are attached to an upper surface of the housing 16.

The turntable 11 is a table for rotating a record 17 and has a circular plane shape. The record 17 is placed on a top surface of the turntable 11. A spindle 18 rotatably supports the turntable 11. The spindle 18 and the turntable 11 are engaged by an engaging portion (not shown), and the spindle 18 and the turntable 11 rotate together. In a state where the turntable 11 is attached, the tip of the spindle 18 protrudes from the center of the upper surface of the turntable 11. The tip of the spindle 18 is used to attach the record 17 placed on the turntable 11. A top plate 16a of the housing 16 is provided with a bearing 19 (see FIG. 2). The spindle 18 is inserted into the bearing 19 and rotatably supported. The spindle 18 constitutes a rotation axis R11 of the turntable 11.

The turntable 11 has a magnetic member 21 on its outer peripheral portion. The magnetic member 21 constitutes a non-contact transmission mechanism 13 together with a drive-side rotor 28 to be described later.

The housing 16 has a rectangular parallelepiped shape, and four leg members 22 for supporting the housing 16 are provided at the four corners of the bottom surface. In addition, the housing 16 is provided with a speed selector switch 23, a start/stop switch 24, and a power button 26. The start/stop switch 24 is a switch for switching rotation and stop of the turntable 11 in a state where the power of the record player 10 is turned on. The speed selector switch 23 is a switch for switching the number of revolutions of the turntable 11 between, for example, 33+⅓ revolutions per minute and 45 revolutions per minute.

The tone arm 14 is arranged on a side from the turntable 11. At the tip of the tone arm 14, a cartridge 27 constituting a pickup mechanism is detachably provided. A stylus, coils, and a permanent magnet (not shown) are attached to the cartridge 27. In the cartridge 27, upon the stylus contacting a groove of the record 17 vibrates, the coils and the permanent magnet mutually vibrate. The cartridge 27 converts the vibration of the stylus into an electric signal through electro-magnetic inductive action between the coils and the permanent magnet, and outputs the electric signal.

The drive motor 12 is mounted inside the housing 16 and generates a driving force for rotating the turntable 11. The attachment structure of the drive motor 12 to the housing 16 will be described later.

To reproduce the record 17, the record 17 is placed on the turntable 11 with the spindle 18 inserted in the center opening of the record 17.

As the turntable 11 starts rotation, the record 17 also starts rotation. As the cartridge 27 at the tip of the tone arm 14 moves on the rotating record 17 and the tone arm 14 descends, the stylus of the cartridge 27 comes into contact with the surface of the record 17. The cartridge 27 picks up an audio signal corresponding to a sound groove of the record 17 through the stylus and converts it into an electric signal. The electric signal is outputted to a built-in speaker, an external speaker, a headphone or the like via an amplifier (not shown), so that the sound recorded in the record 17 is reproduced.

[Non-Contact Transmission Mechanism]

Figure 2:
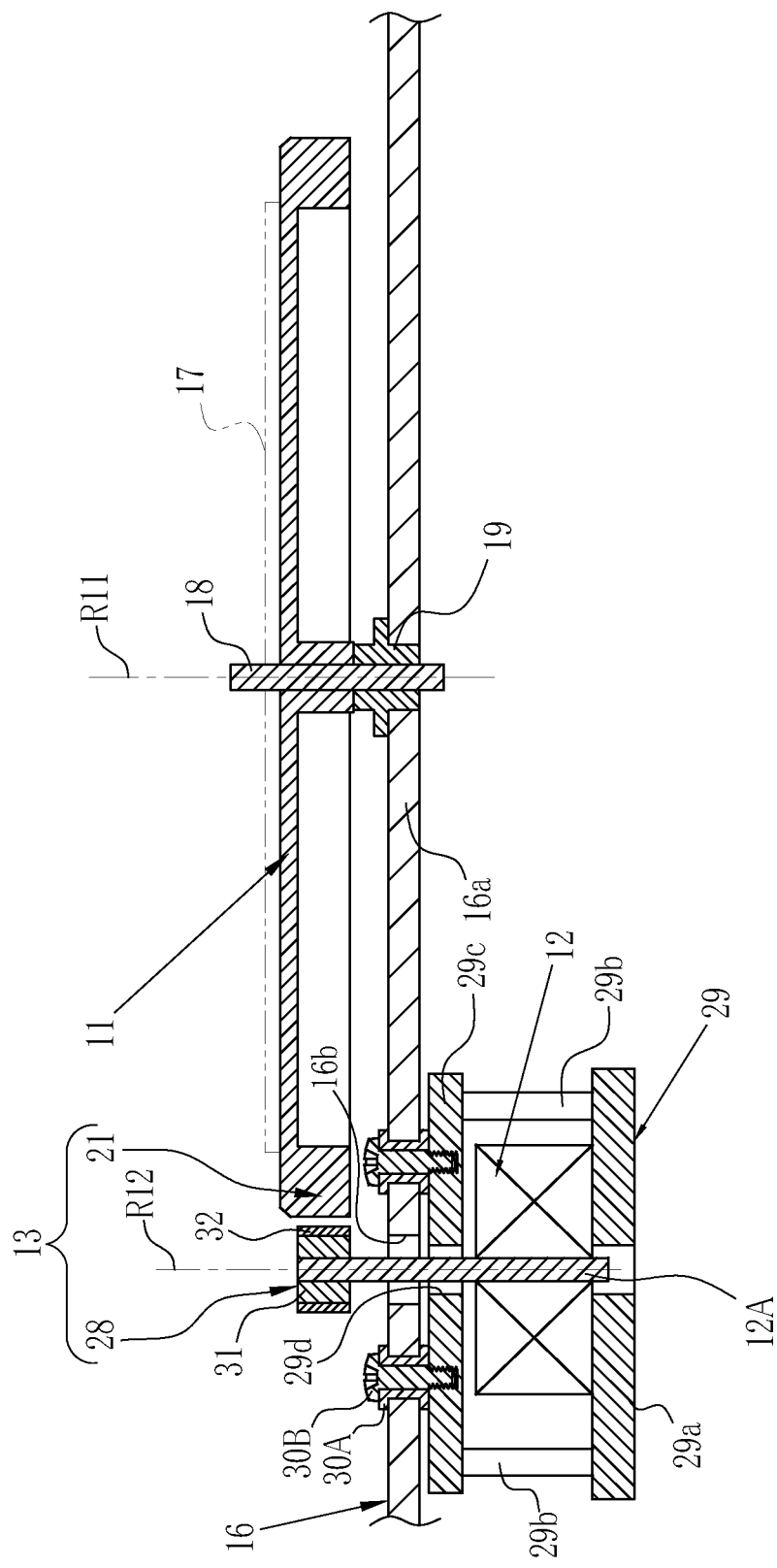
FIG. 2 is a cross-sectional view of a main part of the record player.
Figure 3:
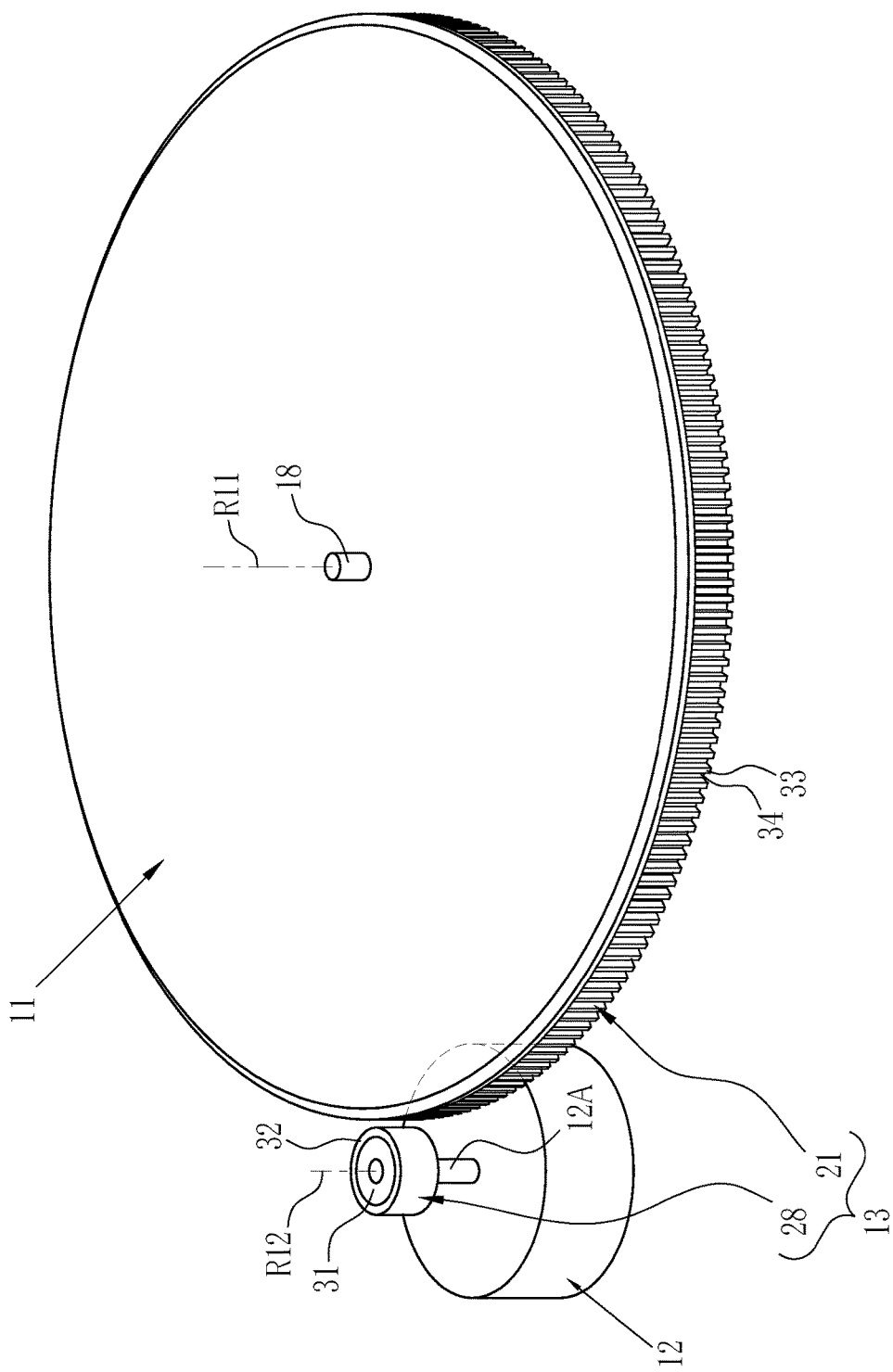
FIG. 3 is a perspective view showing a non-contact transmission mechanism.

As shown in FIGS. 2 and 3, the non-contact transmission mechanism 13 includes the magnetic member 21 provided on the outer peripheral portion of the turntable 11, and the drive-side rotor 28. The drive-side rotor 28 is coupled to a drive shaft 12A of the drive motor 12 in a rigid manner and rotated by the driving force of the drive motor 12.

The drive motor 12 is held by a holding member 29. The holding member 29 includes a base plate 29a, a spacer member 29b, and a fixing plate 29c. The drive motor 12 is fixed on the base plate 29a. The spacer member 29b holds the base plate 29a and the fixing plate 29c with a predetermined space between the base plate 29a and the fixing plate 29c.

The drive motor 12 is disposed in the space formed between the base plate 29a and the fixing plate 29c by the spacer member 29b. The fixing plate 29c is attached to the top plate 16a of the housing 16, for example via an anti-vibration bush 30A and a stepped screw 30B. The anti-vibration bush 30A is formed of an elastic body such as rubber, and is formed in a substantially cylindrical shape having a flange portion at the top and bottom. The anti-vibration bush 30A is fitted in a plurality of places of the top plate 16a.

The stepped screw 30B is inserted into the inner peripheral surface of the anti-vibration bush 30A, and the tip end of the stepped screw 30B is screwed into a screw hole formed in the fixing plate 29c, so that the top plate 16a and the fixing plate 29c are connected. Thereby, the drive motor 12 is mounted inside the housing 16 via the holding member 29, the anti-vibration bush 30A and the stepped screw 30B. The drive shaft 12A of the drive motor 12 protrudes upward from the top plate 16a of the housing 16 through a through-hole 29d and a through-hole 16b formed in the fixing plate 29c and the top plate 16a. Since the drive motor 12 is attached to the housing 16 via the anti-vibration bush 30A, vibration of the drive motor 12 is absorbed by the anti-vibration bush 30A. Thereby, it is possible to prevent the vibration of the drive motor 12 from being transmitted to the turntable 11.

The drive-side rotor 28 is rotatably attached to the housing 16 via the holding member 29, the anti-vibration bush 30A, the stepped screw 30B and the drive motor 12. The drive-side rotor 28 is constituted of a column member 31 and a permanent magnet 32 which are integrally provided. The column member 31 is constituted of a nonmagnetic body. The column member 31 is centrally penetrated by the drive shaft 12A protruding from the housing 16 so as to be attached to the drive shaft 12A. The drive-side rotor 28 is rotated by the rotation of the drive shaft 12A, and the drive shaft 12A constitutes a rotation axis R12 of the drive-side rotor 28.

The permanent magnet 32 is formed in a cylindrical shape and is arranged along the outer peripheral surface of the column member 31. The permanent magnet 32 is a multi-polar-magnetized hard magnetic body. Specifically, N poles and S poles are alternately arranged at equal intervals in the circumferential direction. In this embodiment, the permanent magnet 32 is magnetized for example to 18 poles, that is, it has nine N poles and nine S poles (see FIGS. 4A to 4C).

In the outer peripheral portion of the drive-side rotor 28, the permanent magnet 32 is provided on a side face parallel to the rotation axis R12 of the drive-side rotor 28. The turntable 11 and the drive-side rotor 28 are arranged with their respective rotation axes R11 and R12 in a parallel state and their side faces opposed to each other.

As shown in FIG. 1, the drive-side rotor 28 is arranged on a rear side from the rotation axis R11 of the turntable 11 as viewed from a front face 16c of the housing 16. Note that the front face 16c of the housing 16 is a face located on the front side as the record player 10 is placed. For example, among the four surfaces in contact with the top plate 16a of the housing 16, the surface closest to the cartridge 27 is defined as the front face. In addition, the drive-side rotor 28 is arranged on the opposite side to the tone arm 14 across the turntable 11.

The magnetic member 21 is constituted of a soft magnetic body. The magnetic member 21 is provided on the entire circumference of the outer peripheral portion of the turntable 11. In this embodiment, the magnetic member 21 is formed integrally with the turntable 11. That is, the turntable 11 is also constituted of a soft magnetic body. The soft magnetic body has the characteristic that it is magnetized only while it is in the magnetic field of the magnet and has no magnetic force after leaving the magnetic field. As the soft magnetic body, for example, electromagnetic pure iron or ferrosilicon is used.

As described above, the cartridge 27 will be affected by magnetism because it has the coils and the permanent magnet. There is a concern that the influence of magnetism causes deterioration in reading quality of the audio signal. In this embodiment, the drive-side rotor 28 having the permanent magnet 32 is disposed on the opposite side to the cartridge 27 across the turntable 11. Therefore, since the permanent magnet 32 is disposed at a position distant from the cartridge 27 in the housing 16, the cartridge 27 is hardly affected by the magnetic force from the permanent magnet 32.

The magnetic member 21 is provided on the outer peripheral portion of the turntable 11, and is magnetized by the permanent magnet 32. The magnetic member 21 is arranged in the vicinity of the cartridge 27. However, since the magnetic member 21 is constituted of a soft magnetic body, a portion of the magnetic member 21 located in the vicinity of the permanent magnet 32 is magnetized but the magnetic force does not remain in a portion of the magnetic member 21 retracted outside the magnetic field of the permanent magnet 32. Accordingly, in the housing 16, the cartridge 27 located away from the permanent magnet 32 is less influenced by the magnetic member 21. Therefore, there is little concern of deteriorating the reading quality of the audio signal of the cartridge 27.

The magnetic member 21 is provided on a side face of the outer peripheral portion of the turntable 11 which is parallel to the rotation axis R11. The magnetic member 21 is partially opposing the permanent magnet 32, so that an attraction force due to the magnetic force from the permanent magnet 32 acts on the magnetic member 21. The turntable 11 is rotated according to the rotation of the drive-side rotor 28 by an attraction force acting on the magnetic member 21 from the permanent magnet 32.

The magnetic member 21 has a gear shape in which a projection portion 33 and a recessed portion 34 are alternately arranged at regular intervals in the circumferential direction. The projection portion 33 and the recessed portion 34 respectively correspond to the first portion and the second portion in the claims.

The projection portion 33 is projecting from the magnetic member 21 toward the permanent magnet 32 where the magnetic member 21 and the permanent magnet 32 are facing. In this embodiment, since the turntable 11 and the drive-side rotor 28 are disposed so that their side faces are opposed to each other, the projection portion 33 protrudes in the radial direction of the turntable 11. The recessed portion 34 is recessed in the direction in which the distance from the magnetic member 21 to the permanent magnet 32 becomes greater than that at the projection portion 33. Accordingly, the influence of the magnetic force from the permanent magnet 32 is relatively larger to the projection portion 33 than to the recessed portion 34.

An interval of each of the projection portions 33 of the magnetic member 21 is defined so that one of the two adjacent projection portions 33 sandwiching one of the recessed portions 34 faces the N pole of the permanent magnet 32 and the other faces the S pole of the permanent magnet 32 adjacent to the N pole where the magnetic member 21 and the permanent magnet 32 are facing. In this embodiment, the magnetic member 21 has for example 216 pieces of each of the projection portions 33 and the recessed portions 34.

Among the components of the record player 10, the turntable 11 has the largest outer diameter. Since the magnetic member 21 is provided on the outer peripheral portion of the turntable 11, the turntable 11 functions as a driven-side rotor driven by the drive-side rotor 28. Since the turntable 11 having the large outer diameter functions as the driven-side rotor, the reduction ratio corresponding to the ratio of the rotational speed of the turntable 11 to the rotational speed of the drive motor 12 and the drive-side rotor 28 can be increased.

In this embodiment, the drive-side rotor 28 having 18 magnetic poles, and the magnetic member 21 has 216 projection portions 33 corresponding to each magnetic pole. In this case, the reduction ratio is 216:18=12:1. Since the rotation speed of the turntable 11 is determined by the standard for records, the rotation speed of the drive-side rotor 28 and the drive motor 12 can be increased as the reduction ratio becomes larger. As the rotation speed of the drive-side rotor 28 and the drive motor 12 becomes higher, the rotation unevenness becomes smaller, and as the rotation unevenness becomes smaller, the sound quality becomes more improved. Therefore, by providing the magnetic member 21 in the outer peripheral portion of the turntable 11, reduction in rotation unevenness becomes possible and improving sound quality can be expected.

Also, in order to reduce the rotational unevenness, it is advantageous that the turntable 11 is heavier since the moment of inertia becomes larger. In the case where the turntable 11 is heavy, a large rotational force is required. However, as described above, in this embodiment, since the reduction ratio of the turntable 11 with respect to the drive motor 12 can be increased, it is easy to transmit the large rotational force. This is also the effect of providing the magnetic member 21 in the outer peripheral portion of the turntable 11.

Figure 4A:
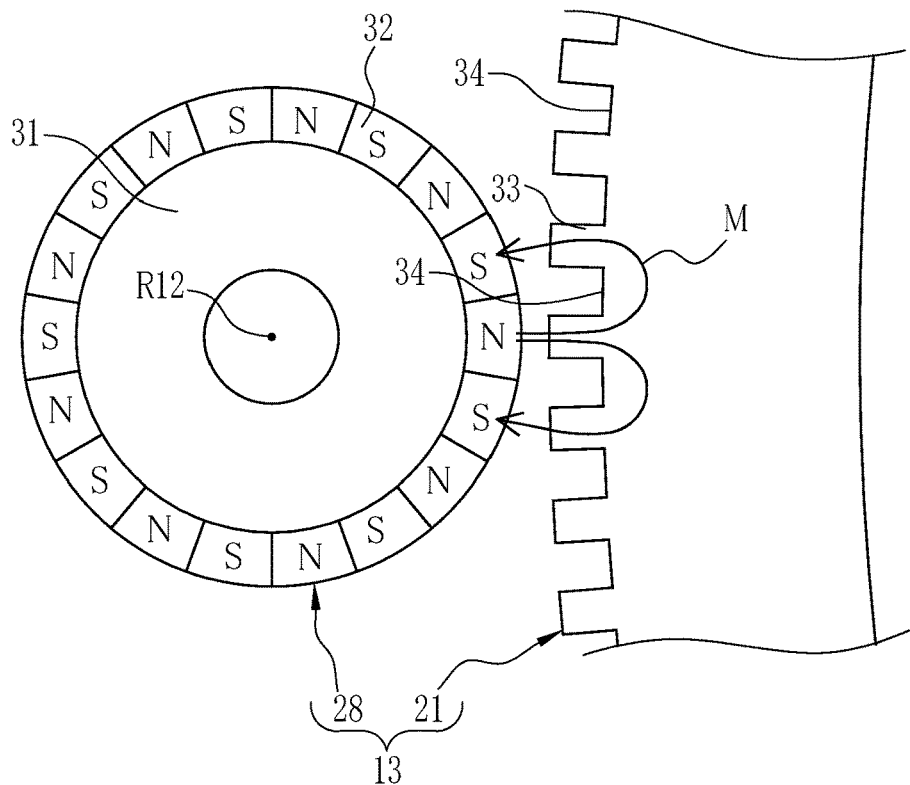
FIG. 4A is a state diagram showing directions of magnetic lines of force in a state where a drive-side rotor and a magnetic member are stopped.

An operation principle of the non-contact transmission mechanism 13 having the above configuration will be described. As shown in FIG. 4A, in the magnetic member 21 which is a soft magnetic body, the portion located in the vicinity of the permanent magnet 32 is magnetized by the permanent magnet. For example, in the magnetic member 21, the projection portion 33 facing the N pole of the permanent magnet 32 becomes an S pole and the projection portion 33 facing the S pole of the permanent magnet 32 becomes an N pole. Therefore, an attraction force is generated between the magnetic poles of the permanent magnet 32 and the magnetic member 21.

As shown in FIG. 4A, the magnetic flux M occurring between the permanent magnet 32 and the magnetic member 21 flows from the N pole of the permanent magnet 32 toward the projection portion 33, passes through the inside of the magnetic member 21, and flows from the tip end of the adjacent projection portion 33 across the recessed portion 34 therebetween to the S pole of permanent magnet 32. The magnetic flux M is formed so that the magnetic path (the path of the magnetic flux) becomes the shortest. As shown in FIG. 4A, as the magnetic poles of the permanent magnet 32 and the magnetic member 21 face each other, the magnetic flux M becomes a straight line between the magnetic poles.

Figure 4B:
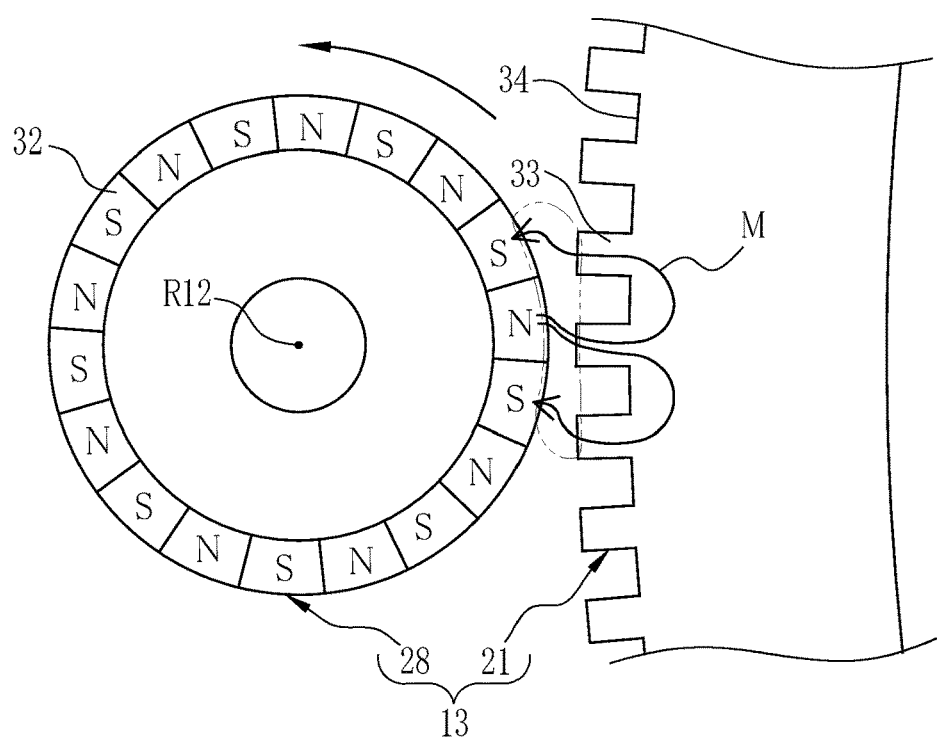
FIG. 4B is a state diagram showing directions of magnetic lines of force in a state where the drive-side rotor starts to rotate.
Figure 4C:
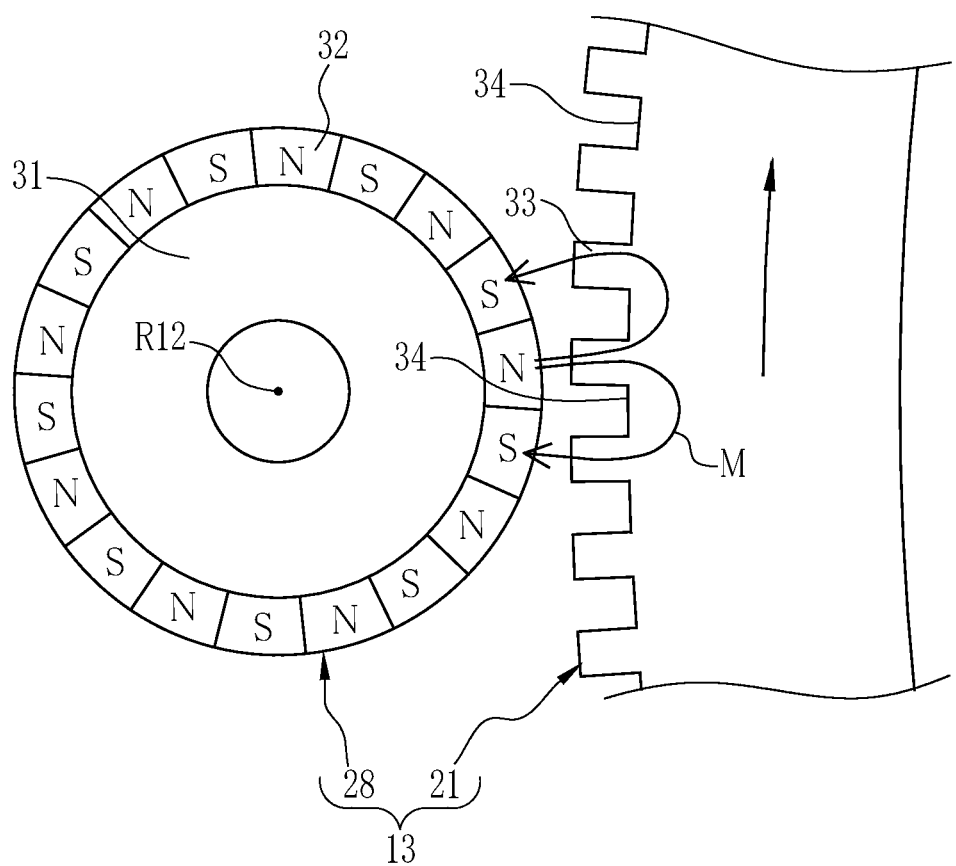
FIG. 4C is a state diagram showing directions of magnetic lines of force in a state where the magnetic member rotates following the drive-side rotor.

As shown in FIG. 4B, as the drive-side rotor 28 starts to rotate by the driving force of the drive motor 12, the magnetic flux M between the magnetic poles of the permanent magnet 32 and the magnetic member 21 (within the range surrounded by the two-dot chain line) becomes curved according to the rotation. In the case where the magnetic flux M curves between the magnetic poles, the magnetic force generated by the permanent magnet 32 acts on the magnetic member 21 so that the magnetic path of the magnetic flux M becomes the shortest, that is, the curved portion of the magnetic flux M in FIG. 4B returns to a straight line. This magnetic force acts as an attraction force by which the permanent magnet 32 attracts the magnetic member 21. As shown in FIG. 4C, this attraction force is transmitted to the turntable 11 as the rotational force to rotate the turntable 11 following the rotation of the drive-side rotor 28.

Also, as described above, since the magnetic member 21 is a soft magnetic body, a portion in the magnetic field of the permanent magnet 32 is magnetized, but the magnetic force does not remain in the portion after being retracted outside the magnetic field. In the magnetic member 21, since the portion retracted outside the magnetic field of the permanent magnet 32 does not emit a magnetic force, the portion of the magnetic member 21 outside the magnetic field of the permanent magnet 32 does not affect surroundings.

The non-contact transmission mechanism 13 can transmit the driving force of the drive motor 12 to the turntable 11 in a non-contact manner by a magnetic force. Therefore, it is possible to suppress the vibration of the drive motor 12, which affects the sound quality, from being transmitted to the turntable 11.

As described above, the record player 10 has the non-contact transmission mechanism 13 which makes it easy to visually recognize a state of non-contact driving of the turntable 11 from outside and has little adverse effect by magnetism to users and sound quality.

Specifically, the magnetic member 21 opposing the permanent magnet 32 of the drive-side rotor 28 is provided on the outer peripheral portion of the turntable 11. Therefore, compared with a case where a magnetic member is provided in the vicinity of the rotation axis on the back side of the turntable or the like, it is easy to visually confirm the state of non-contact driving from outside.

In addition, the magnetic member 21 is constituted of a soft magnetic body which has the characteristic that it is magnetized only while it is in the magnetic field of the permanent magnet 32 and has no magnetic force after leaving the magnetic field. Accordingly, the portion magnetized in the turntable 11 is limited as compared with for example a case where the magnetic member is a permanent magnet or a hard magnetic body having the characteristic of remaining a magnetic force. Therefore, even though the magnetic member 21 is provided in the outer peripheral portion of the turntable 11 which is frequently accessed by users, there is little adverse effect on the users due to magnetism.

Also, by using a soft magnetic body for the magnetic member 21, there become the following effects. As in the prior arts (refer to JP 2005-083487 A and JP 2001-251844 A), in the case where both the drive-side rotor and the driven-side rotor are constituted of a magnet or a ferromagnetic body, an attraction force between them is increased, and a load on a bearing is increased. Therefore, the bearing deteriorates quickly. On the other hand, the record player 10, which is the combination of the permanent magnet 32 and the magnetic member 21 of a soft magnetic body, can reduce deterioration of the bearing 19. In addition, since the amount of use of an expensive magnet or a ferromagnetic body can be reduced, cost reduction of the record player 10 is also possible.

Further, as described above, by providing the magnetic member 21 on the outer peripheral portion of the turntable 11, the reduction ratio is increased so that it is possible to expect the effect of reducing the rotation unevenness. In addition, since the magnetic member 21 is a soft magnetic body and the permanent magnet 32 of the drive-side rotor 28 is disposed at a position relatively away from the cartridge 27 in the housing 16, the adverse effect to the cartridge 27 due to magnetism can be reduced.

Figure 5:
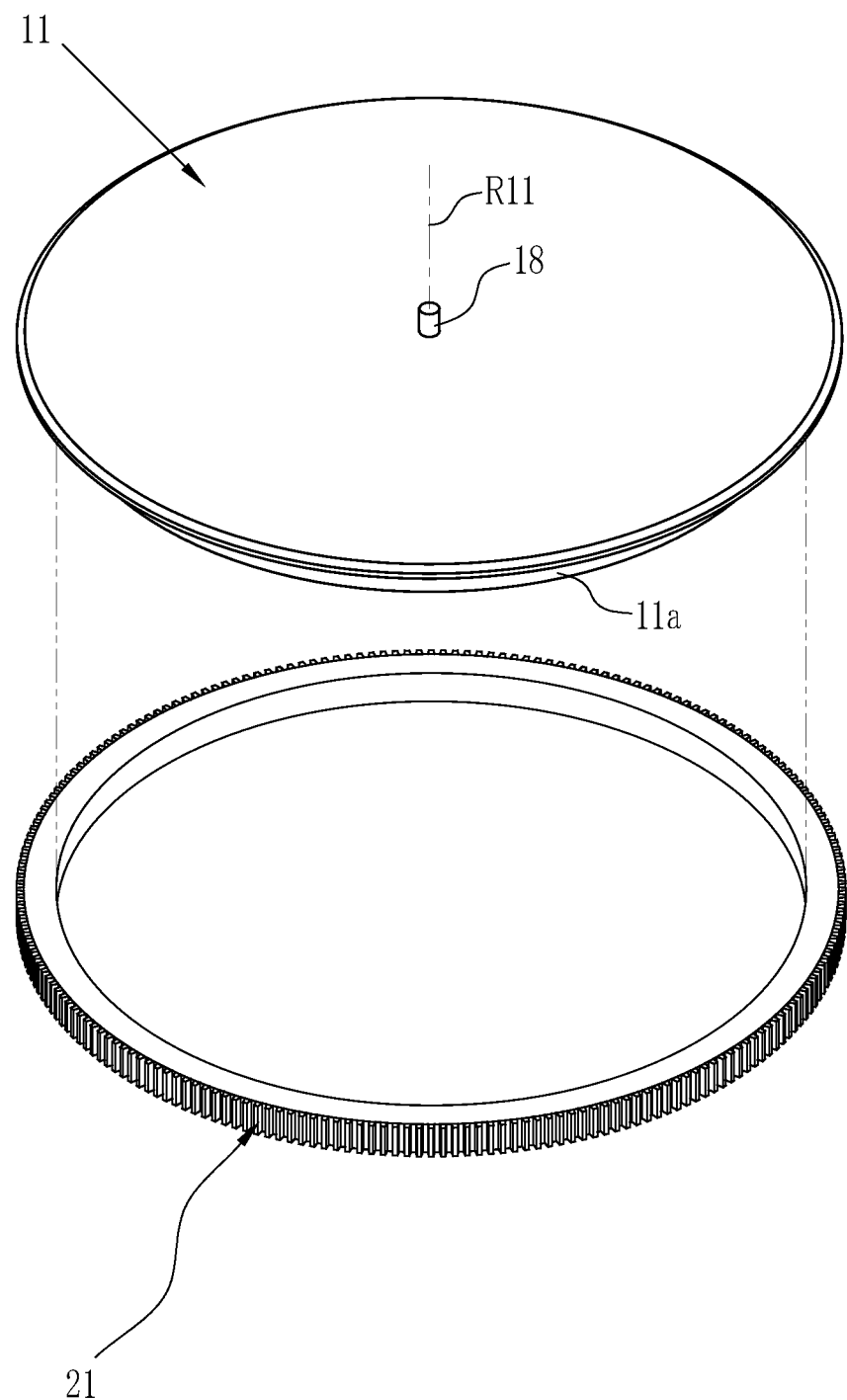
FIG. 5 is a perspective view of a variation in which the magnetic member is an accessory component of the turntable.

In the above first embodiment, the magnetic member 21 is integrally formed with the turntable 11. However, as shown in FIG. 5, the magnetic member 21 may be attached as an accessory part to the outer peripheral portion of the turntable 11. In this case, for example, a circular boss 11a is formed to protrude from a lower surface of the turntable 11, and the magnetic member 21 formed in an annular shape is fitted to the boss 11a to be integrated.

Second Embodiment

Figure 6:
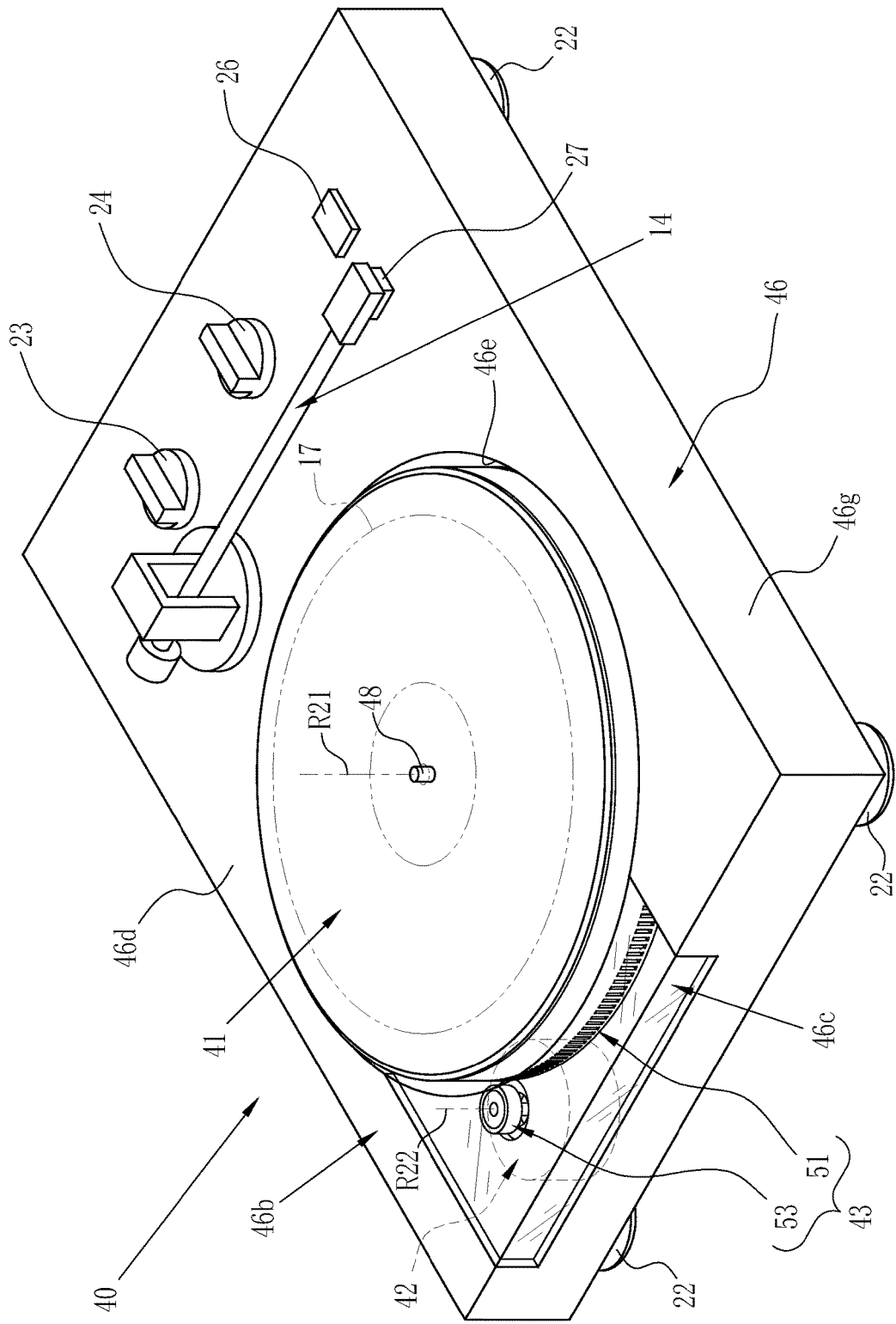
FIG. 6 is a perspective view of a record player of a second embodiment.

FIGS. 6 to 9 illustrate a second embodiment. In the first embodiment, the magnetic member constituting the non-contact transmission mechanism has a gear shape in which the projection portion (first portion) and the recessed portion (second portion) are alternately arranged at regular intervals in the circumferential direction. On the other hand, as shown in FIG. 6, in a record player 40 of the second embodiment, a magnetic member constituting the non-contact transmission mechanism has an annular body formed along the outer periphery of the turntable, with a plurality of opening portions formed at equal intervals in the circumferential direction. In the annular body as the magnetic member, a peripheral surface portion connecting the adjacent opening portions corresponds to the first portion and the opening portion corresponds to the second portion. As described above, the magnetic member is not limited to the uneven shape, and an opening may be used instead of the recessed portion.

Also, in the record player 40 of the second embodiment, the drive-side rotor and the magnetic member are arranged inside the housing, and a transparent plate is provided in the housing so that a portion where the drive-side rotor and the magnetic member face each other is visible from outside. The above makes difference from the first embodiment on the appearance of the housing. In the second embodiment, the same members as those of the first embodiment are denoted by the same reference numerals, and the description thereof is omitted, and the differences from the first embodiment will be mainly described.

The record player 40 includes a turntable 41, a drive motor 42, a non-contact transmission mechanism 43, the tone arm 14, and a housing 46.

The turntable 41 has a circular plane shape as same as the turntable 11 of the first embodiment, and the record 17 is placed on a top surface of the turntable 41. A spindle 48 is inserted in a bearing 49 (see FIG. 7) and is rotatably supported. The spindle 48 constitutes a rotation axis R21 of the turntable 41.

Figure 7:
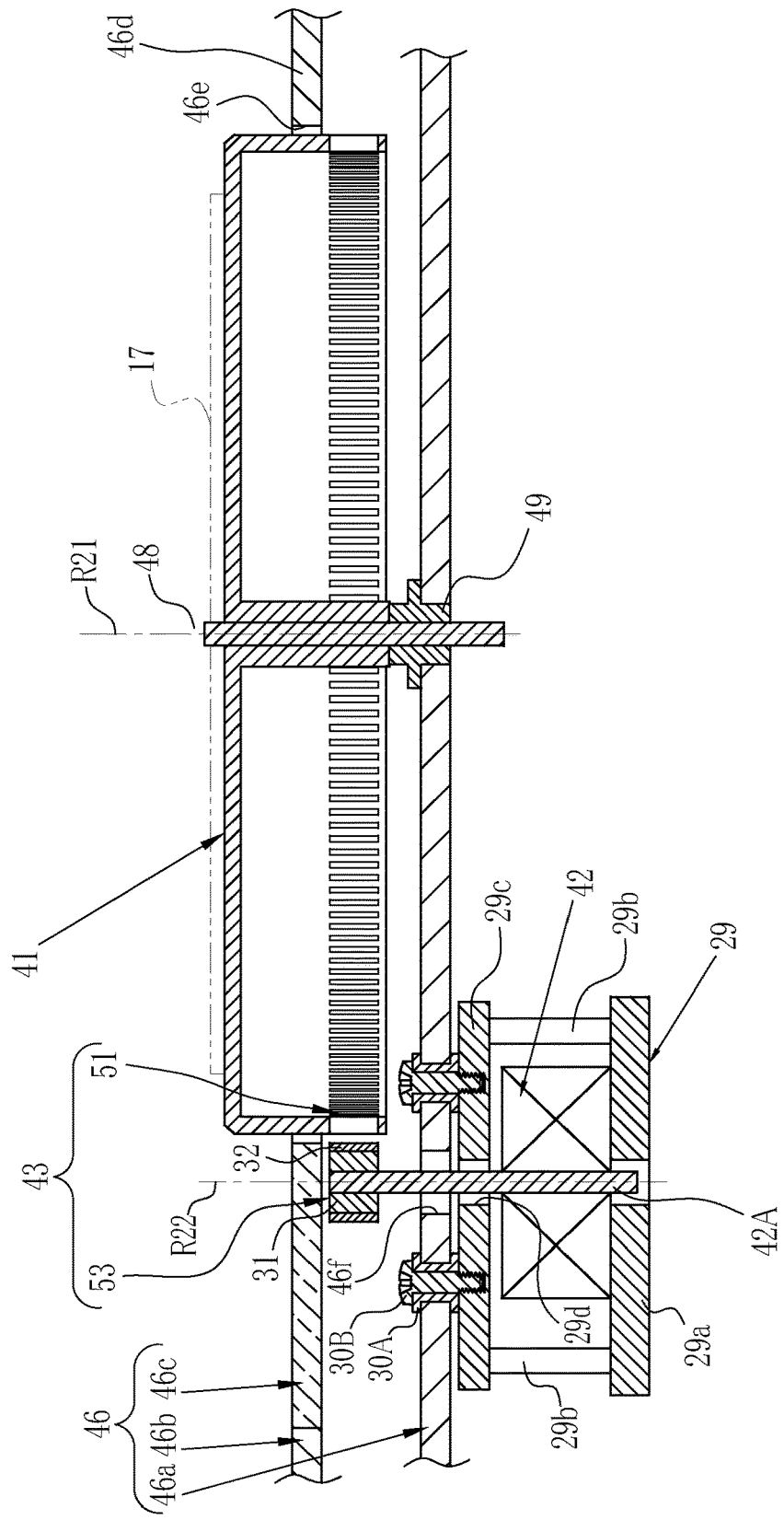
FIG. 7 is a cross-sectional view of a main part of the record player of the second embodiment.

The housing 46 includes an internal frame 46a, a case 46b, and a transparent plate 46c. As shown in FIG. 7, the internal frame 46a is accommodated in the case 46b, and is a mount base plate to which components such as the drive motor 42 and the bearing 49 are attached. The drive motor 42 rotates the turntable 41.

An opening portion 46e is formed on a top plate 46d of the case 46b. A lower portion of the turntable 41 is embedded inside the case 46b through the opening portion 46e. A drive-side rotor 53 coupled with a drive shaft 42A of the drive motor 42 described later is disposed inside the case 46b together with the lower portion of the turntable 41. This makes it possible to enhance shielding effect for a magnetic force generated by the drive-side rotor 53.

The attachment structure of the drive motor 42 to the internal frame 46a is the same as the attachment structure of the drive motor 12 to the housing 16 of the first embodiment described above, and the drive motor 42 is attached to the internal frame 46a via the holding member 29, the anti-vibration bush 30A and the stepped screw 30B. Thereby, it is possible to prevent the vibration of the drive motor 42 from being transmitted to the turntable 41.

The drive shaft 42A of the drive motor 42 protrudes upward from the internal frame 46a through the through-hole 29d and a through-hole 46f formed in the fixing plate 29c and the internal frame 46a.

Figure 8:
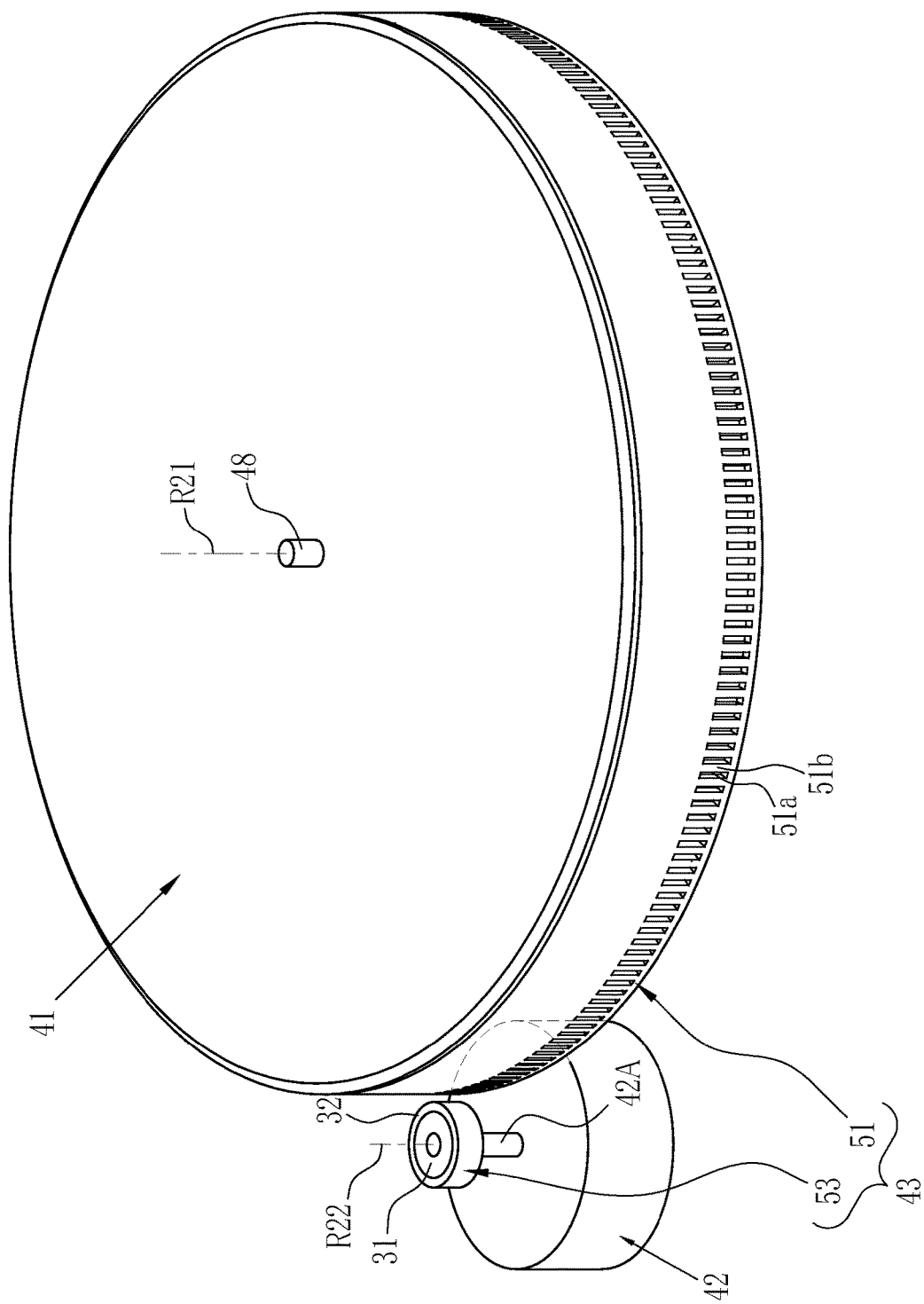
FIG. 8 is a perspective view showing a non-contact transmission mechanism of the second embodiment.

As shown in FIG. 8, the non-contact transmission mechanism 43 includes a magnetic member 51 and a drive-side rotor 53. The drive-side rotor 53 is coupled to the drive shaft 42A of the drive motor 42 in a rigid manner and rotated by the driving force of the drive motor 42.

The drive-side rotor 53 is rotatably attached to the internal frame 46a via the holding member 29, the anti-vibration bush 30A, the stepped screw 30B and the drive motor 42. As same as the drive-side rotor 28 of the first embodiment, the drive-side rotor 53 is constituted of the column member 31 and the permanent magnet 32 which are integrally provided, and the permanent magnet 32 is magnetized for example to 18 poles. The column member 31 is centrally penetrated by the drive shaft 42A protruding from the internal frame 46a so as to be rotated with the drive shaft 42A. The drive shaft 42A constitutes a rotation axis R22 of the drive-side rotor 53.

The permanent magnet 32 is provided on a side face of the outer peripheral portion of the drive-side rotor 53 which is parallel to the rotation axis R22. The turntable 41 and the drive-side rotor 53 are arranged with their respective rotation axes R21 and R22 in a parallel state and their side faces opposed to each other.

As same as the drive-side rotor 28 of the first embodiment, the drive-side rotor 53 is arranged on a rear side from the rotation axis R21 of the turntable 41 as viewed from a front face 46g of the housing 46. In addition, the drive-side rotor 53 is arranged on the opposite side to the tone arm 14 across the turntable 41.

As same as the magnetic member 21 of the first embodiment, the magnetic member 51 is constituted of a soft magnetic body, and is provided on the entire circumference of the outer peripheral portion of the turntable 41. The magnetic member 51 is provided on a side face of the outer peripheral portion of the turntable 41 which is parallel to the rotation axis R21. The magnetic member 51 is partially opposing the permanent magnet 32, so that an attraction force due to the magnetic force from the permanent magnet 32 acts on the magnetic member 51.

The magnetic member 51 is provided on a lower portion of the turntable 41. The drive-side rotor 53 is arranged in the housing 46 so as to face the magnetic member 51. To the case 46b, the transparent plate 46c is provided at a position corresponding to a portion of the case 46b inside which the drive-side rotor 53 is disposed. The transparent plate 46c is formed with a certain size so that a portion where the drive-side rotor 53 and the magnetic member 51 face each other can be visually recognized. Through the transparent plate 46c, from outside it is possible to visually recognize the state where the drive-side rotor 53 drives the turntable 41 without contact.

The magnetic member 51 is the annular body formed along the outer periphery of the turntable 41, and a plurality of opening portions 51a is formed on the annular body at equal intervals. In addition, the magnetic member 51 is provided with a peripheral surface portion 51b connecting between each of the opening portions 51a. The each opening portion 51a and the each peripheral surface portion 51b are alternately arranged at equal intervals in the circumferential direction.

Accordingly, the influence of the magnetic force from the permanent magnet 32 is relatively larger to the peripheral surface portion 51b than to the opening portion 51a. As described above, the peripheral surface portion 51b corresponds to the first portion and the opening portion 51a corresponds to the second portion.

An interval of each of the peripheral surface portions 51b of the magnetic member 51 which is the annular body is defined so that each one of the two adjacent peripheral surface portions 51b sandwiching one of the opening portions 51a faces the border of the N pole and the S pole where the magnetic member 51 and the permanent magnet 32 are facing. In this embodiment, the magnetic member 51 has for example 216 pieces of each of the opening portions 51a and the peripheral surface portions 51b. Therefore, as same as in the first embodiment, the reduction ratio of the magnetic member 51 to the drive-side rotor 53, that is, the reduction ratio of the turntable 41 to the drive motor 42 is 12:1.

Figure 9:
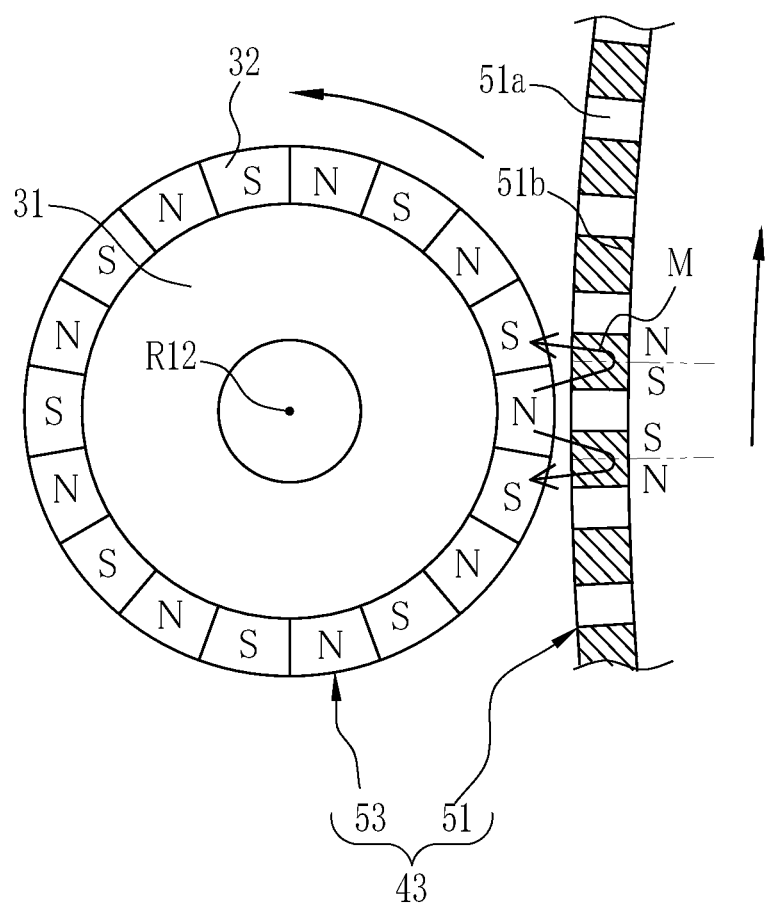
FIG. 9 is a state diagram showing directions of magnetic lines of force in a state where a drive-side rotor and a magnetic member of the second embodiment are stopped.

An operation principle of the non-contact transmission mechanism 43 of the second embodiment will be described with referring to FIG. 9. As shown in FIG. 9, in the magnetic member 51 which is a soft magnetic body, the portion located in the vicinity of the permanent magnet 32 is magnetized by the permanent magnet 32, as same as in the first embodiment. As same as in the first embodiment, also in the second embodiment, the magnetic force generated by the permanent magnet 32 acts so that the magnetic path of the magnetic flux M becomes the shortest between the permanent magnet 32 and the magnetic member 51.

In the second embodiment, each of the peripheral surface portions 51b faces the border of the N pole and the S pole where the magnetic member 51 and the permanent magnet 32 are facing. As shown in FIG. 9, the magnetic path of the magnetic flux M becomes the shortest in a state where the substantially central portion of the peripheral surface portion 51b faces the boundary between the N pole and the S pole. In this state, one of the N poles and the S pole adjacent to this N pole of the permanent magnet 32 are opposed to one of the peripheral surface portions 51b. The magnetic flux M heads from the N pole of the permanent magnet 32 to one opposing peripheral surface portion 51, turns back in the magnetic member 51, and heads from the same peripheral surface portion 51 to the opposing S pole. As a result, an attraction force is generated between the magnetic poles of the permanent magnet 32 and the magnetic member 51.

As same as in the first embodiment, also in the second embodiment, as the drive-side rotor 53 starts to rotate by the driving force of the drive motor 42, the magnetic flux M between the magnetic poles becomes curved. Then the magnetic force generated by the permanent magnet 32 acts on the magnetic member 51 so that the magnetic path of the magnetic flux M becomes the shortest, that is, the curved portion of the magnetic flux M returns to a straight line. This force acts as an attraction force by which the permanent magnet 32 attracts the magnetic member 51. This attraction force is transmitted to the turntable 41 as the rotational force to rotate the turntable 41 following the rotation of the drive-side rotor 53.

As same as in the first embodiment, the portion of the magnetic member 51 outside the magnetic field of the permanent magnet 32 does not affect surroundings.

Also in the second embodiment, the effects of providing the magnetic member 51 in the outer peripheral portion of the turntable 41 is the same as in the first embodiment. Note that in the second embodiment, the turntable 41 having the magnetic member 51 in the lower portion is provided so as to be embedded in the housing 46. Therefore, unlike the first embodiment, in order to allow the state of non-contact driving to be visually recognized from outside, the transparent plate 46c attached to a part of the housing 46 is necessary. However, since the magnetic member 51 is provided on the outer peripheral portion of the turntable 41, compared with the case where the drive-side rotor 53 and the magnetic member 51 are provided in the inner peripheral side of the turntable 41, it is easier to visually recognize the state of non-contact driving from outside.

The transparent plate 46c in the second embodiment is an example, and the size and shape of the transparent plate 46c may be changed appropriately. For example, the entire case 46b may be transparent.

Third Embodiment

Figure 10:
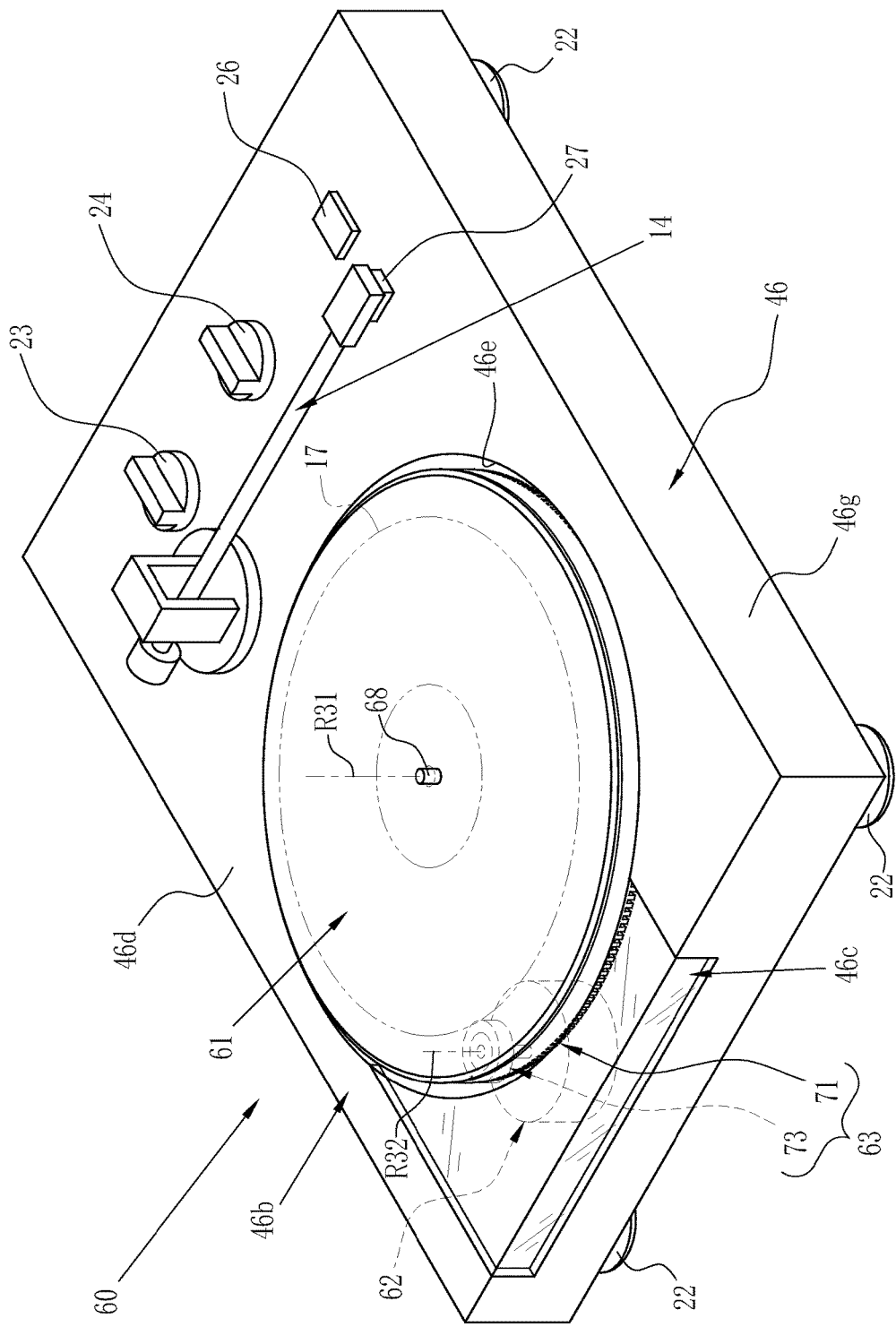
FIG. 10 is a perspective view of a record player of a third embodiment.

FIGS. 10 to 13 illustrate a third embodiment. In the first and second embodiments, the magnetic members 21 and 51 are provided on the side surfaces of the outer peripheral portions of the turntables 11 and 41, which are parallel to the rotation axis of the turntables 11 and 41. On the other hand, as shown in FIG. 10, in a record player 60 of the third embodiment, in the outer peripheral portion of turntable, a magnetic member is provided on a plane orthogonal to the rotation axis of the turntable.

As same as in the record player 40 of the second embodiment, also in the record player 60 of the third embodiment, the drive-side rotor and the magnetic member are arranged inside the housing, and a transparent plate is provided in the housing so that a portion where the drive-side rotor and the magnetic member face each other is visible from outside. In the third embodiment, the same members as those of the first and second embodiments are denoted by the same reference numerals, and the description thereof is omitted, and the differences from the first and second embodiments will be mainly described.

The record player 60 includes a turntable 61, a drive motor 62, a non-contact transmission mechanism 63, the tone arm 14, and the housing 46.

The turntable 61 has a circular plane shape as same as the turntable 11 of the first embodiment, and the record 17 is placed on a top surface of the turntable 61. A spindle 68 is inserted in the bearing 49 (see FIG. 11) and is rotatably supported. The spindle 68 constitutes a rotation axis R31 of the turntable 61.

Figure 11:
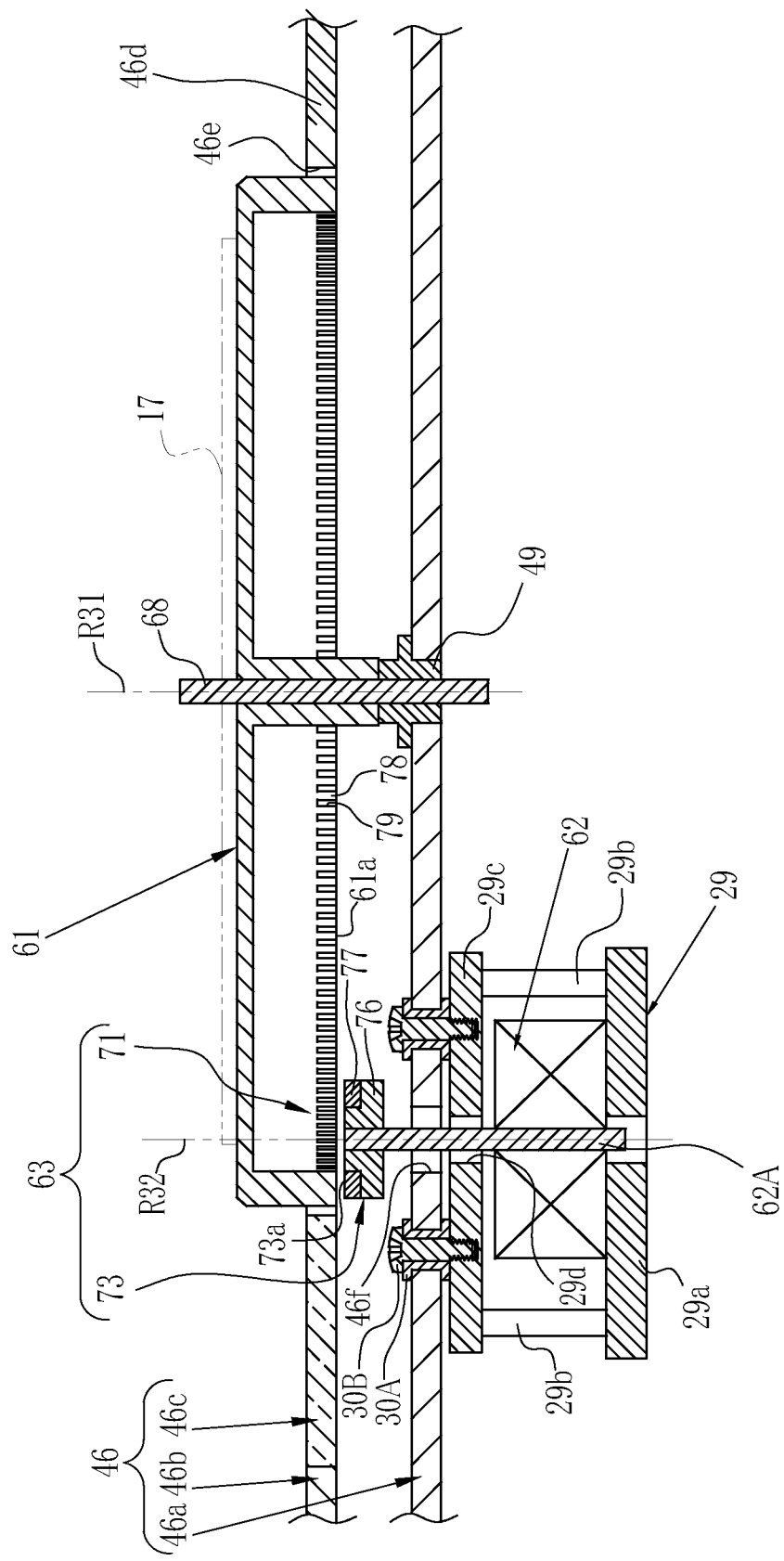
FIG. 11 is a cross-sectional view of a main part of the record player of the third embodiment.

As shown in FIG. 11, the turntable 61 is formed integrally with a magnetic member 71.

As same as in the second embodiment using the turntable 41, a lower portion of the turntable 61 is embedded inside the case 46b through the opening portion 46e. A drive-side rotor 73 coupled with a drive shaft 62A of the drive motor 62 described later is disposed inside the case 46b together with the lower portion of the turntable 61. This makes it possible to enhance shielding effect for a magnetic force generated by the drive-side rotor 73.

The attachment structure of the drive motor 62 to the internal frame 46a is the same as the attachment structure of the drive motor 12 to the housing 16 of the first embodiment described above, and the drive motor 62 is attached to the internal frame 46a via the holding member 29, the anti-vibration bush 30A and the stepped screw 30B. Thereby, it is possible to prevent the vibration of the drive motor 62 from being transmitted to the turntable 61.

The drive shaft 62A of the drive motor 62 protrudes upward from the internal frame 46a through the through-hole 29d and a through-hole 46f formed in the fixing plate 29c and the internal frame 46a.

Figure 12:
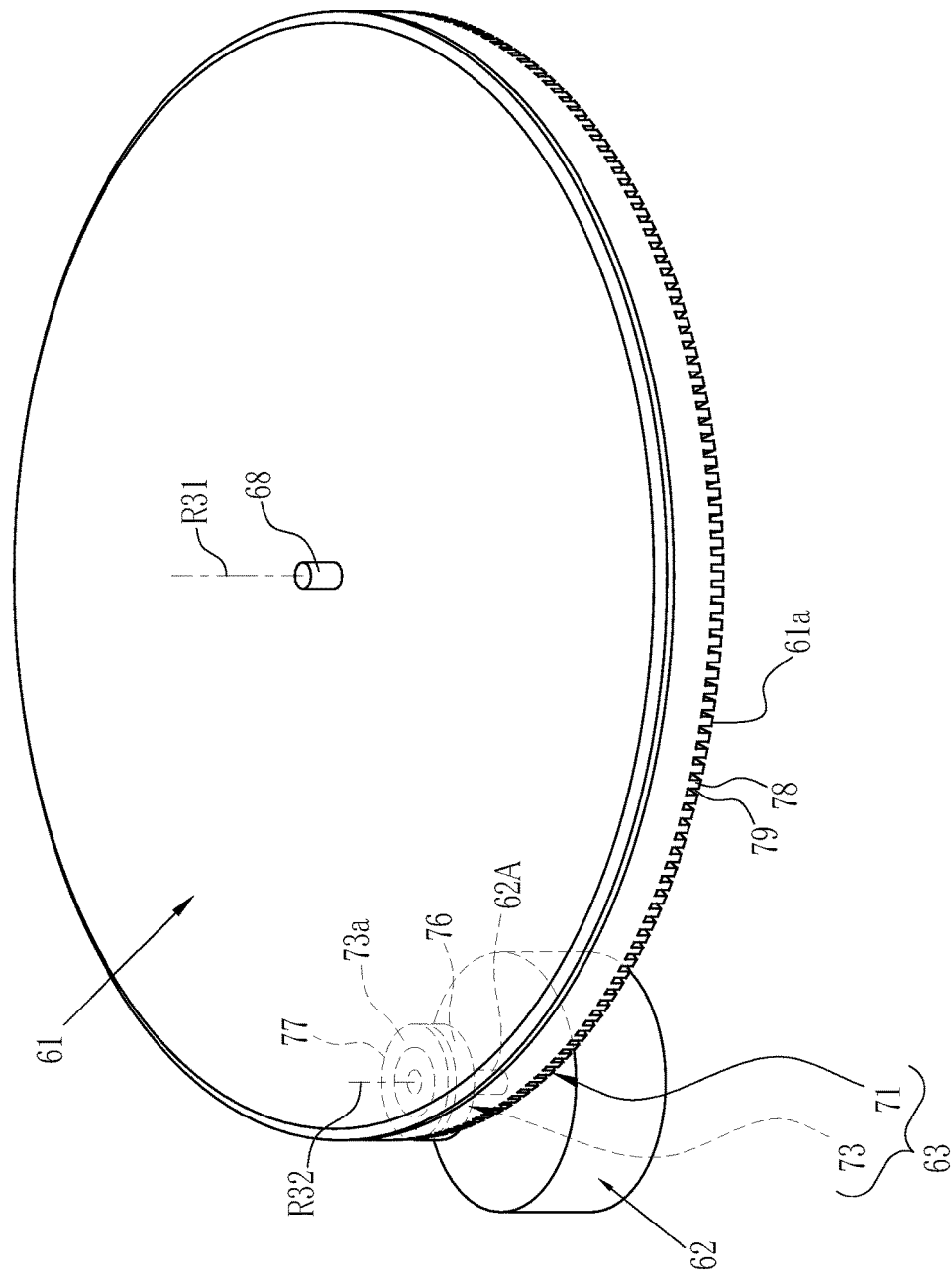
FIG. 12 is a perspective view showing a non-contact transmission mechanism of the third embodiment.

As shown in FIG. 12, the non-contact transmission mechanism 63 includes a magnetic member 71 and a drive-side rotor 73. The drive-side rotor 73 is coupled to the drive shaft 62A of the drive motor 62 in a rigid manner and rotated by the driving force of the drive motor 62.

The drive-side rotor 73 is rotatably attached to the internal frame 46a via the holding member 29, the anti-vibration bush 30A, the stepped screw 30B and the drive motor 62. The drive-side rotor 73 is constituted of a disk plate 76 and a permanent magnet 77 which are integrally provided. The disk plate 76 is centrally penetrated by the drive shaft 62A protruding from the internal frame 46a so as to be rotated with the drive shaft 62A. The drive shaft 62A constitutes a rotation axis R32 of the drive-side rotor 73.

The permanent magnet 77 is formed in an annular shape and is arranged on a top surface of the disk plate 76. The permanent magnet 77 is provided on a plane 73a orthogonal to the rotation axis R32 of the drive-side rotor 73 in the outer peripheral portion of the drive-side rotor 73. As same as the permanent magnet 22 of the first embodiment, the permanent magnet 77 is a hard magnetic body multipolar-magnetized for example to 18 poles.

As same as the drive-side rotor 28 of the first embodiment, the drive-side rotor 73 is arranged on a rear side from the rotation axis R31 of the turntable 61 as viewed from a front face 46g of the housing 46. In addition, the drive-side rotor 73 is arranged on the opposite side to the tone arm 14 across the turntable 61.

As same as the magnetic member 21 of the first embodiment, the magnetic member 71 is constituted of a soft magnetic body, and is provided on the entire circumference of the outer peripheral portion of the turntable 61. The magnetic member 71 is provided on a plane 61a of the outer peripheral portion of the turntable 61, which is orthogonal to the rotation axis R31.

The magnetic member 71 is provided on a lower portion of the turntable 61. The turntable 61 and the drive-side rotor 73 are arranged with their respective rotation axes R31 and R32 in a parallel state and their planes 61a and 73a partially opposed to each other. To the case 46b, the transparent plate 46c is provided at a position corresponding to a portion of the case 46b inside which the drive-side rotor 73 is disposed. The transparent plate 46c is formed with a certain size so that a portion where the drive-side rotor 73 and the magnetic member 71 face each other can be visually recognized. Through this transparent plate 46c, from outside it is possible to visually recognize the state where the drive-side rotor 53 drives the turntable 41 without contact.

The magnetic member 71 has a crown gear shape in which a projection portion 78 and a recessed portion 79 are alternately arranged at regular intervals in the circumferential direction. The projection portion 78 and the recessed portion 79 respectively correspond to the first portion and the second portion in the claims.

The projection portion 78 is projecting from the magnetic member 71 toward the permanent magnet 77 where the magnetic member 71 and the permanent magnet 77 are facing. In this embodiment, since the turntable 61 and the drive-side rotor 73 are disposed so that their planes 61a, 73a are opposed to each other, the projection portion 78 protrudes in the direction parallel to the rotation axis R31 of the turntable 61. The recessed portion 79 is recessed in the direction in which the distance from the magnetic member 71 to the permanent magnet 77 becomes greater than that at the projection portion 78. Accordingly, the influence of the magnetic force from the permanent magnet 77 is relatively larger to the projection portion 78 than to the recessed portion 79.

An interval of each of the projection portions 78 of the magnetic member 71 is defined so that one of the two adjacent projection portions 78 sandwiching one of the recessed portions 79 faces the N pole of the permanent magnet 77 and the other faces the S pole of the permanent magnet 77 adjacent to the N pole where the magnetic member 71 and the permanent magnet 77 are facing. In this embodiment, the magnetic member 51 has for example 216 pieces of each of the projection portions 78 and the recessed portions 79. Therefore, as same as in the first and second embodiments, the reduction ratio of the magnetic member 71 to the drive-side rotor 73, that is, the reduction ratio of the turntable 61 to the drive motor 62 is 12:1.

Figure 13:
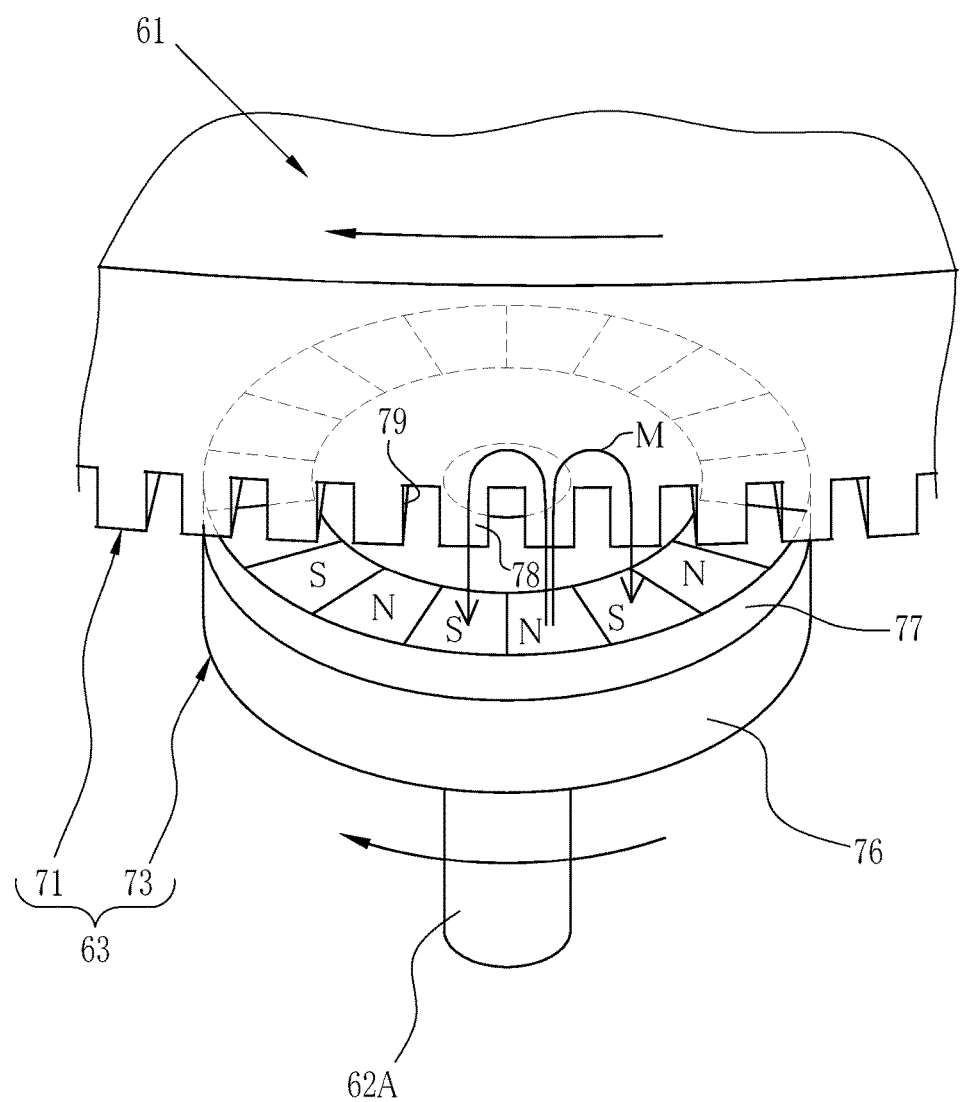
FIG. 13 is a perspective view showing a part of a drive-side rotor and a magnetic member of the third embodiment.
Figure 14:
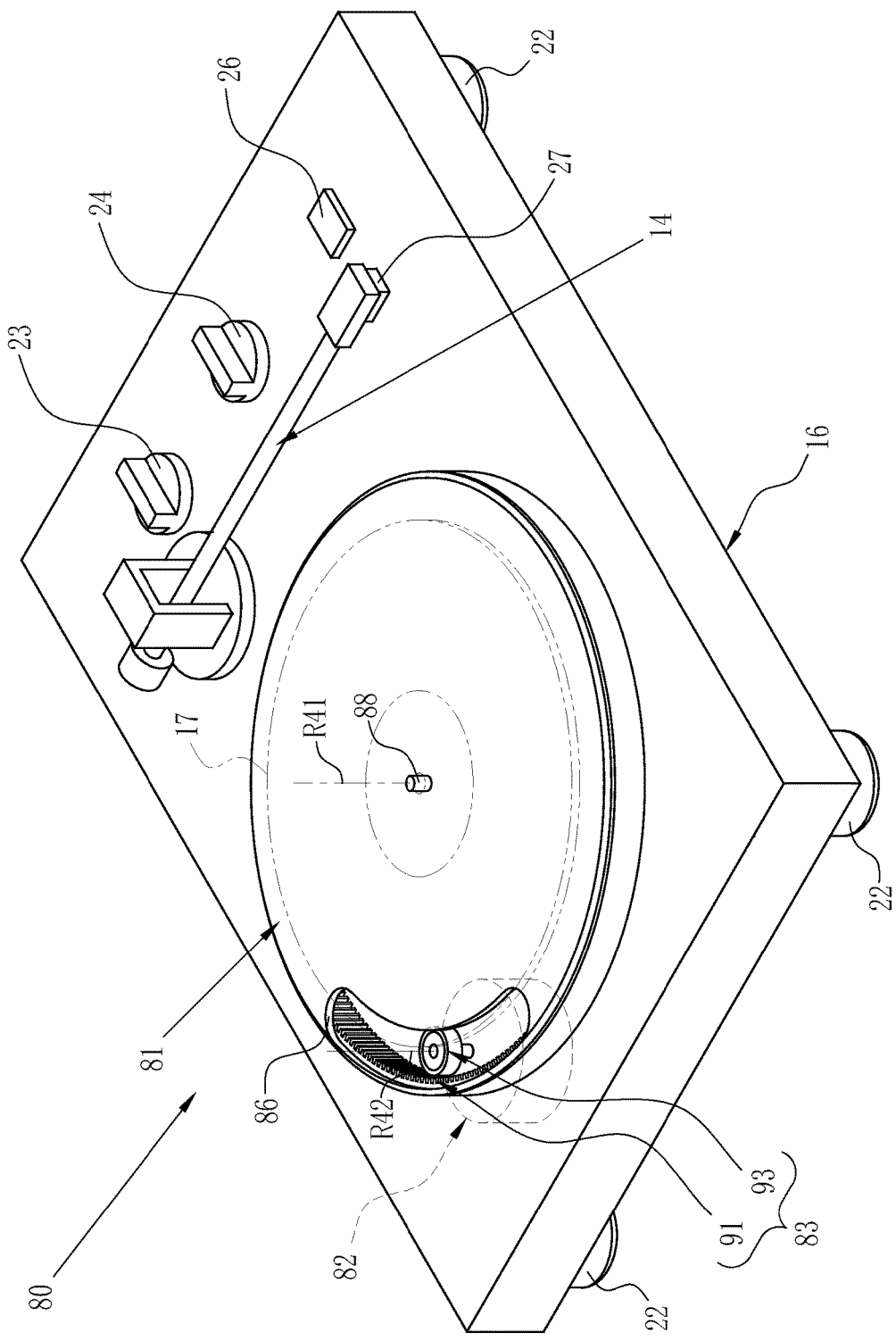
FIG. 14 is a perspective view of a record player of a fourth embodiment.

As same as the non-contact transmission mechanisms 13 and 43 of the first and second embodiments, the non-contact transmission mechanism 63 drives the turntable 61 in a non-contact manner. As shown in FIG. 13, in the magnetic member 71 which is a soft magnetic body, the portion located in the vicinity of the permanent magnet 77 is magnetized by the permanent magnet 77. For example, in the magnetic member 71, the projection portion 78 facing the N pole of the permanent magnet 77 becomes an S pole and the projection portion 78 facing the S pole of the permanent magnet 77 becomes an N pole. Therefore, an attraction force is generated between the magnetic poles of the permanent magnet 77 and the magnetic member 51.

Note that in FIG. 13, the magnetic member 71 and the permanent magnet 77 are illustrated with a certain distance from each other in order to make it easy to understand the illustration of the magnetic flux M occurring between the magnetic member 71 and the permanent magnet 77. However, in reality, the magnetic member 71 and the permanent magnet 77 are arranged close to each other.

The magnetic flux M occurring between the permanent magnet 77 and the magnetic member 71 flows from the N pole of the permanent magnet 77 toward the projection portion 78, passes through the inside of the magnetic member 71, and flows from the tip end of the adjacent projection portion 78 across the recessed portion 79 therebetween to the S pole of permanent magnet 77. The magnetic flux M is formed so that the magnetic path becomes the shortest. As the drive-side rotor 73 starts to rotate by the driving force of the drive motor 62, the magnetic flux M between the magnetic poles becomes curved. Then the magnetic force generated by the permanent magnet 72 acts on the magnetic member 71 so that the magnetic path of the magnetic flux M becomes the shortest, that is, the curved portion of the magnetic flux M returns to a straight line. This force acts as an attraction force by which the permanent magnet 77 attracts the magnetic member 71. This attraction force is transmitted to the turntable 61 as the rotational force to rotate the turntable 61 following the rotation of the drive-side rotor 73.

As same as in the first and second embodiments, the portion of the magnetic member 71 outside the magnetic field of the permanent magnet 77 does not affect surroundings.

Also in the third embodiment, the effects of providing the magnetic member 71 in the outer peripheral portion of the turntable 61 is the same as in the first embodiment. Also in the third embodiment, by embedding the lower portion of the turntable 11 having the magnetic member 71 in the housing 46 and providing the transparent plate 46c for visually confirming from outside the state of non-contact driving, the effect as same as the second embodiment can be obtained. Also in the third embodiment, as same as in the second embodiment, the size and shape of the transparent plate 46c may be changed appropriately.

Fourth Embodiment

FIGS. 14 to 17 illustrate a fourth embodiment. A record player 80 of the fourth embodiment is provided with a magnetic member having a projection portion and a recessed portion on an inner peripheral surface side of an outer peripheral portion of a turntable. In the fourth embodiment, the same members as those of the first to third embodiments are denoted by the same reference numerals, and the description thereof is omitted, and the differences from the first to third embodiments will be mainly described.

The record player 80 includes a turntable 81, a drive motor 82, a non-contact transmission mechanism 83, the tone arm 14, and the housing 16.

The turntable 81 has a circular plane shape and includes a cutout 86. The cutout 86 is an arc-shaped cutout along the outer peripheral portion of the turntable 81, and is formed in such a size that there is no problem in placing the record 17 on a top surface of the turntable 81. A spindle 88 is inserted in the bearing 19 (see FIG. 15) and is rotatably supported. The spindle 88 constitutes a rotation axis R41 of the turntable 81.

Figure 15:
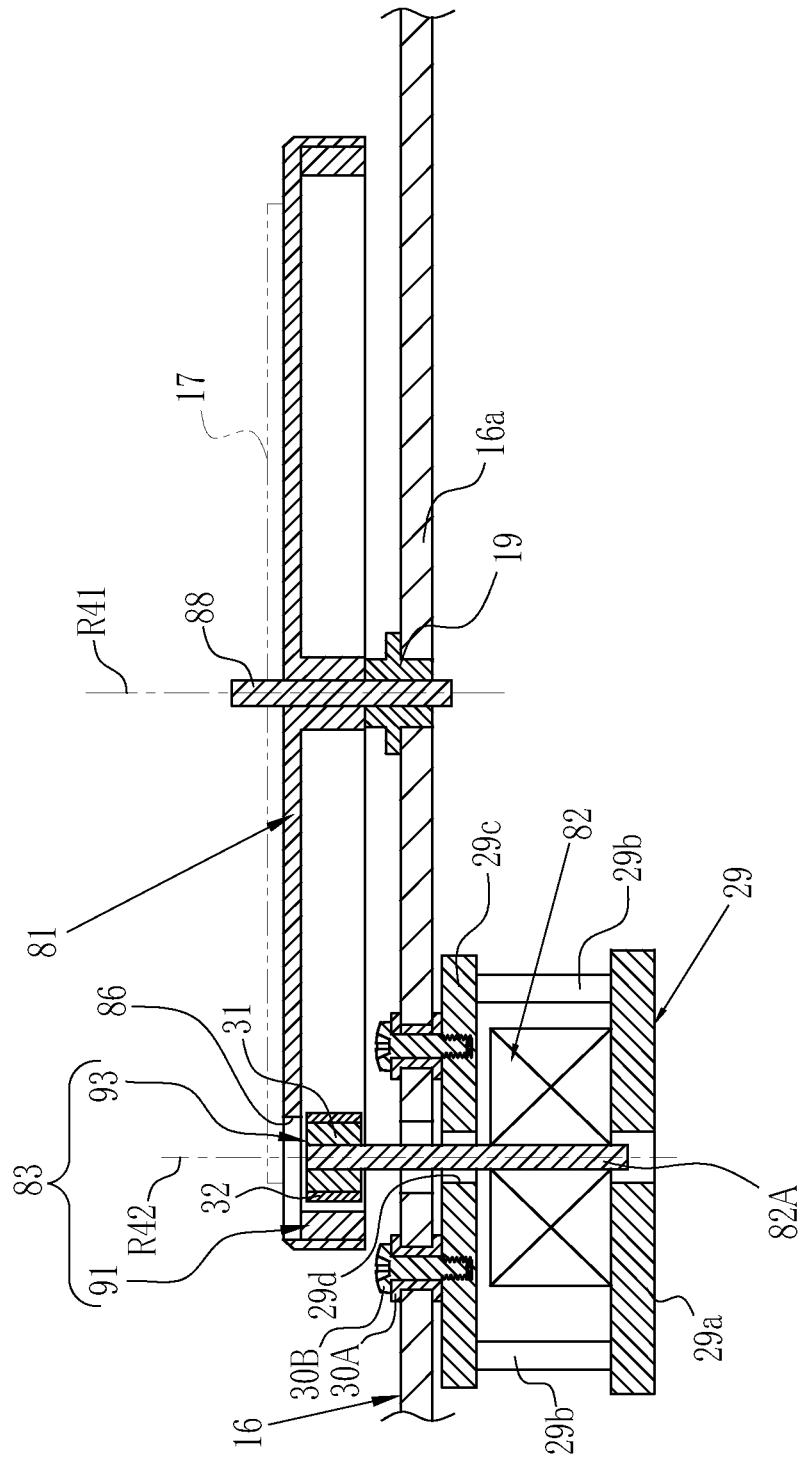
FIG. 15 is a cross-sectional view of a main part of the record player of the fourth embodiment.
Figure 16:
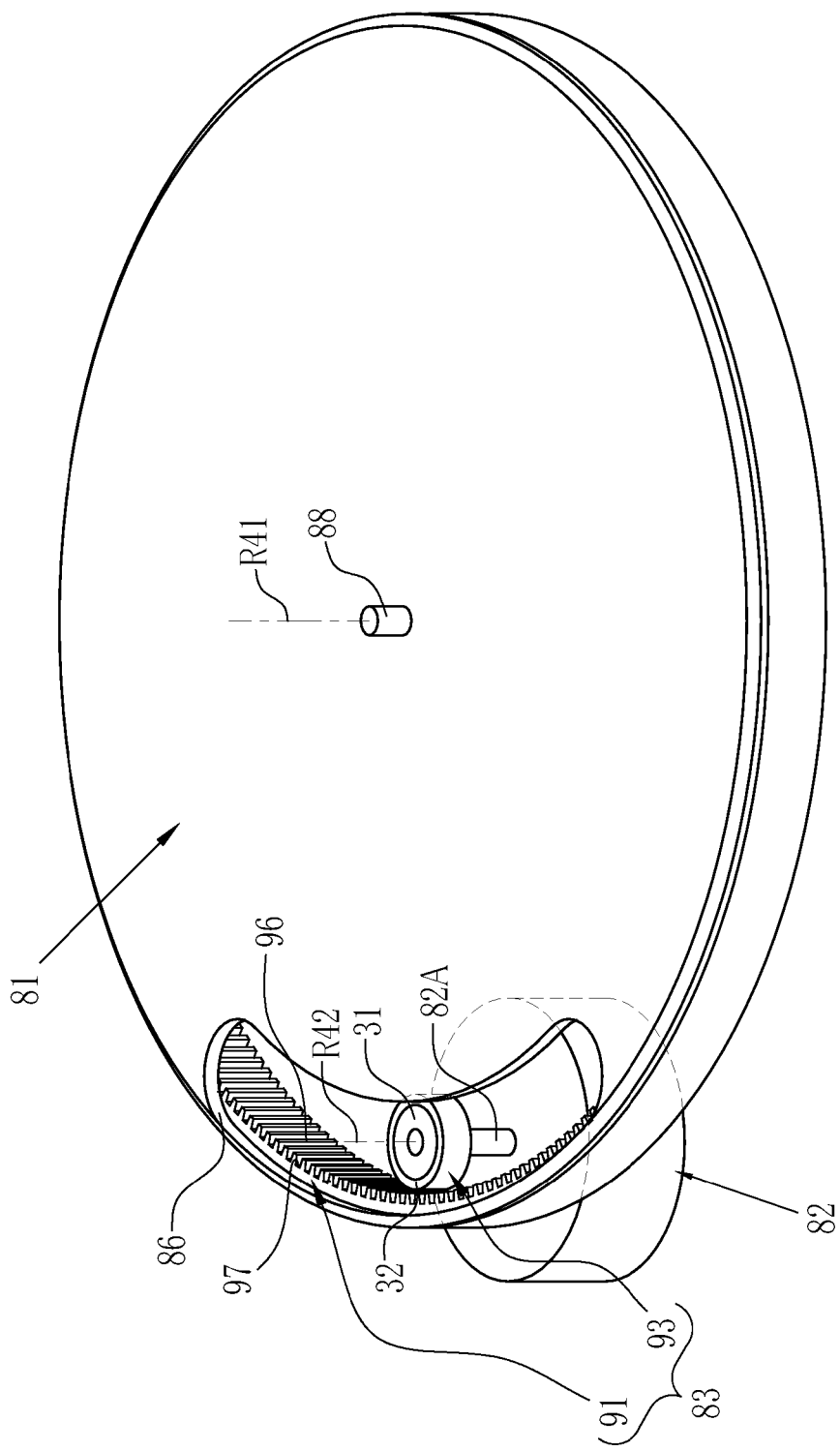
FIG. 16 is a perspective view showing a non-contact transmission mechanism of the fourth embodiment.

As shown in FIGS. 15 and 16, the non-contact transmission mechanism 83 includes a magnetic member 91 and a drive-side rotor 93. The drive-side rotor 93 is coupled to a drive shaft 82A of the drive motor 82 in a rigid manner and rotated by the driving force of the drive motor 82.

The attachment structure of the drive motor 82 to the housing 16 is the same as the attachment structure of the drive motor 12 to the housing 16 of the first embodiment described above, and the drive motor 82 is attached to the housing 16 via the holding member 29, the anti-vibration bush 30A and the stepped screw 30B. Thereby, it is possible to prevent the vibration of the drive motor 82 from being transmitted to the turntable 81.

The drive-side rotor 93 is rotatably attached to the housing 16 via the holding member 29, the anti-vibration bush 30A, the stepped screw 30B and the drive motor 82. As same as the drive-side rotor 28 of the first embodiment, the drive-side rotor 93 is constituted of the column member 31 and the permanent magnet 32 which are integrally provided, and the permanent magnet 32 is magnetized for example to 18 poles. The column member 31 is centrally penetrated by the drive shaft 82A protruding from the housing 16 so as to be rotated with the drive shaft 82A. The drive shaft 82A constitutes a rotation axis 42 of the drive-side rotor 93.

The permanent magnet 32 is provided on a outer peripheral surface of the outer peripheral portion of the drive-side rotor 93 which is parallel to the rotation axis R42. The turntable 81 and the drive-side rotor 93 are arranged with their respective rotation axes R41 and R42 being parallel to each other in a state that the inner peripheral surface of the turntable 81 faces the outer peripheral surface of the drive-side rotor 93.

As same as the drive-side rotor 28 of the first embodiment, the drive-side rotor 93 is arranged on a rear side from the rotation axis R41 of the turntable 81 as viewed from a front face 16c of the housing 16.

Figure 17:
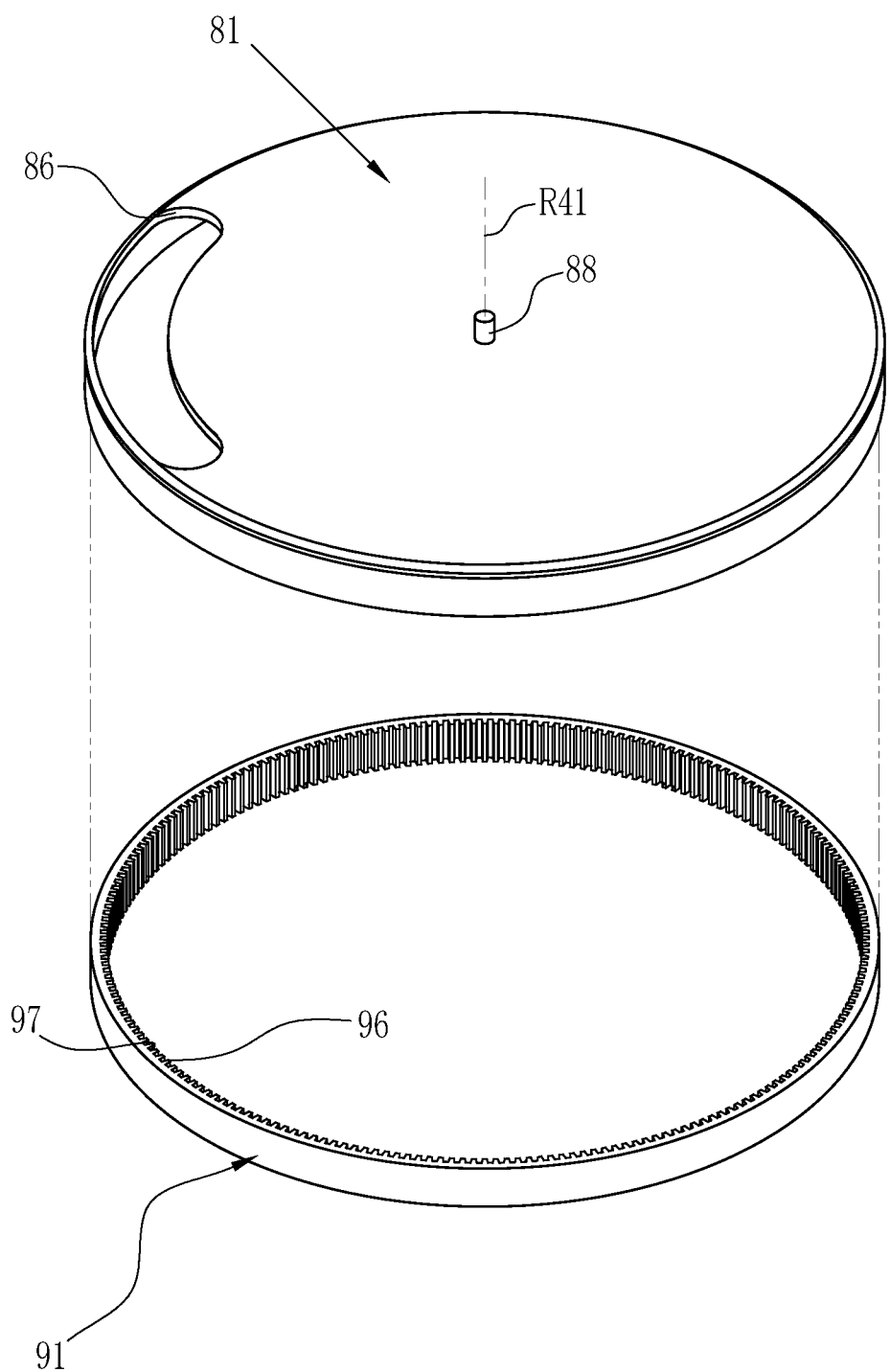
FIG. 17 is a disassembled perspective view showing the configuration of a turntable and a magnetic member of the fourth embodiment.

As shown in FIG. 17, the magnetic member 91 is constituted of a soft magnetic body, and is provided on the entire circumference of the outer peripheral portion of the turntable 81. For example, the magnetic member 91 is provided integrally with the turntable 81 by fitting the outer peripheral surface of the magnetic member 91 into the inner peripheral surface of the turntable 81. The magnetic member 91 is provided on the inner peripheral surface side of the outer peripheral portion of the turntable 81, which is parallel to the rotation axis R41. The magnetic member 91 is partially opposing the permanent magnet 32, so that an attraction force due to the magnetic force from the permanent magnet 32 acts on the magnetic member 91.

The drive-side rotor 93 is arranged inside the turntable 81 so as to face the magnetic member 91. Therefore, as compared with the configuration of the first embodiment, the influence of the magnetic force of the drive-side rotor 93 on the surroundings is reduced. That is, by placing the drive-side rotor 93 inside the turntable 81, it becomes possible to enhance shielding effect for a magnetic force generated from the drive-side rotor 93. In addition, the cutout 86 is provided at a position corresponding to a portion of the turntable 81 in which the drive-side rotor 93 is disposed. The cutout 86 is formed with a certain size so that a portion where the drive-side rotor 93 and the magnetic member 91 face each other can be visually recognized. Through the cutout 86, from outside it is possible to visually recognize the state where the drive-side rotor 93 drives the turntable 81 without contact.

The magnetic member 91 has an internal gear shape in which a projection portion 96 and a recessed portion 97 are alternately arranged at regular intervals in the circumferential direction.

The projection portion 96 and the recessed portion 97 respectively correspond to the first portion and the second portion in the claims.

The projection portion 96 is projecting from the magnetic member 91 toward the permanent magnet 32 where the magnetic member 91 and the permanent magnet 32 are facing. In this embodiment, since the inner peripheral surface of the turntable 81 and the outer peripheral surface of the drive-side rotor 93 are arranged to oppose to each other, the projection portion 96 protrudes in the radial direction of the turntable 81. The recessed portion 97 is recessed in the direction in which the distance from the magnetic member 91 to the permanent magnet 32 becomes greater than that at the projection portion 96. Accordingly, the influence of the magnetic force from the permanent magnet 32 is relatively larger to the projection portion 96 than to the recessed portion 97.

An interval of each of the projection portions 96 of the magnetic member 91 is defined so that one of the two adjacent projection portions 96 sandwiching one of the recessed portions 97 faces the N pole of the permanent magnet 32 and the other faces the S pole of the permanent magnet 32 adjacent to the N pole where the magnetic member 91 and the permanent magnet 32 are facing. In this embodiment, the magnetic member 91 has for example 216 pieces of each of the projection portions 96 and the recessed portions 97. Therefore, as same as in the first to third embodiments, the reduction ratio of the magnetic member 91 to the drive-side rotor 93, that is, the reduction ratio of the turntable 81 to the drive motor 82 is 12:1.

As same as the non-contact transmission mechanisms 13, 43 and 63 of the first to third embodiments, the non-contact transmission mechanism 83 drives the turntable 81 in a non-contact manner. In the magnetic member 91 which is a soft magnetic body, the portion located in the vicinity of the permanent magnet 32 is magnetized by the permanent magnet 32. For example, in the magnetic member 91, the projection portion 96 facing the N pole of the permanent magnet 32 becomes an S pole and the projection portion 96 facing the S pole of the permanent magnet 32 becomes an N pole. Therefore, an attraction force is generated between the magnetic poles of the permanent magnet 32 and the magnetic member 91.

As same as in the first to third embodiments, the magnetic path of the magnetic flux M becomes the shortest between the permanent magnet 32 and the magnetic member 91. As the magnetic flux M between the magnetic poles becomes curved, the magnetic force generated by the permanent magnet 32 acts on the magnetic member 91 so that the magnetic path of the magnetic flux M becomes the shortest. This force acts as an attraction force by which the permanent magnet 32 attracts the magnetic member 91. This attraction force is transmitted to the turntable 81 as the rotational force to rotate the turntable 81 following the rotation of the drive-side rotor 93.

Figure 18:
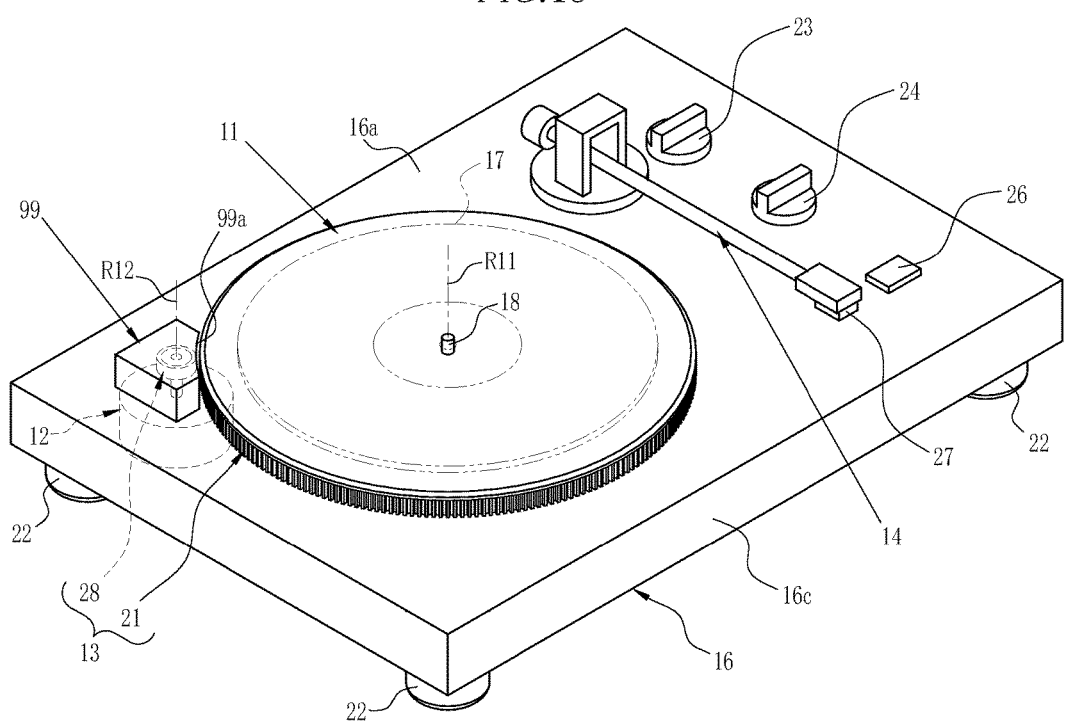
FIG. 18 is a perspective view of a variation provided with a shielding member covering the periphery of the drive-side rotor.

The present application is not limited to the above embodiments. Various modifications, variations and alternatives should be possible within the scope of the present application. In the first embodiment, the permanent magnet of the drive-side rotor is exposed. However, as shown in FIG. 18, a shielding member 99 for covering the periphery of the drive-side rotor 28 may be provided for shielding the magnetic force. In this case, the shielding member 99 is formed from for example a soft magnetic body. In addition, the shielding member 99 has a cutout 99a, and the magnetic member 21 faces the drive-side rotor 28 through the cutout 99a.

Figure 19:
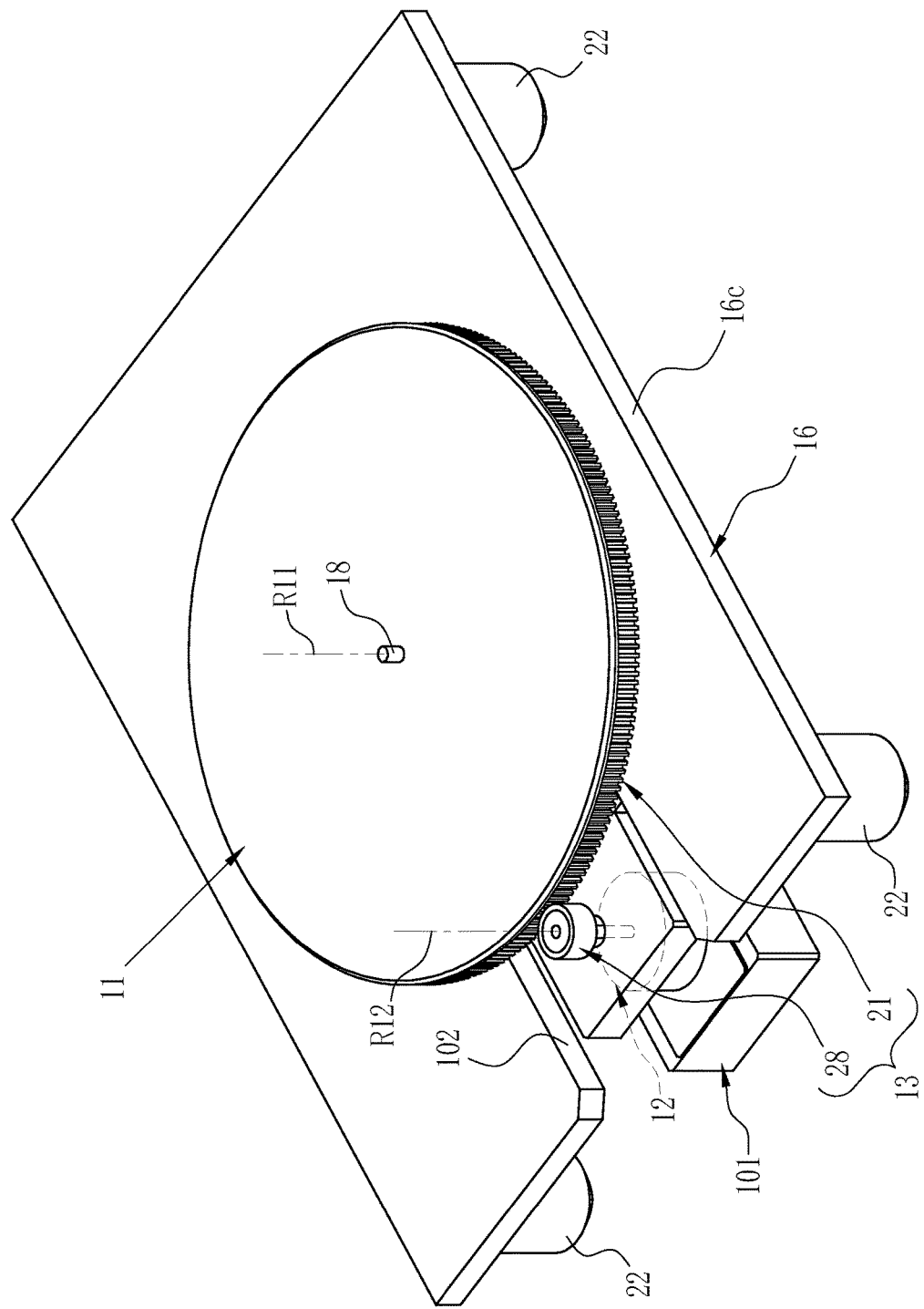
FIG. 19 is a perspective view of a variation in which a holding member holding a drive motor is provided separately from a housing.

In each of the above embodiments, the drive motor is attached inside the housing via the anti-vibration bush 30A and so on. However, as shown in FIGS. 19 and 20, the drive motor may be held by a holding member 101 provided separately from the housing so that the drive motor is installed away from the housing. Thereby, it is possible to prevent the vibration of the drive motor from being transmitted to the turntable.

In the case shown in FIGS. 19 and 20, for example, a cutout 102 cut out from the side surface to a position near the turntable 11 is formed in the housing 16, and a holding member 101 holding the drive motor 12 is installed inside the cutout 102. Accordingly, since the magnetic member and the drive-side rotor can be disposed at positions partially opposed to each other, the rotational force of the drive motor can be transmitted to the turntable in a non-contact manner as same as in the above embodiments. Note that in FIG. 19 and FIG. 20, illustrations of the tone arm 14, the speed selector switch 23, the start/stop switch 24, the power button 26, and so on are omitted.

In the above embodiments, electromagnetic pure iron or ferrosilicon is used as the soft magnetic body constituting the magnetic member. However, it is not limited to above as long as having the characteristic that it is magnetized only while it is in the magnetic field of the permanent magnet and has no magnetic force after leaving the magnetic field. For example, iron having a small carbon content and close to pure iron, silicon steel, permalloy material may be used, and other steel materials that cannot be hardened may be used.

In the above embodiments, the reduction ratio of the magnetic member with respect to the drive-side rotor is set to 12:1. However, the reduction ratio may be appropriately changed according to the rotation speed at which the rotational unevenness of the drive motor is small, the dimensions of the permanent magnet, the magnetic member and so on, and other factors.

In the above embodiments, the permanent magnet forming the drive-side rotor is formed in a cylindrical shape or annular shape. However, the present application is not limited to this, and a plurality of permanent magnets formed in an arc shape may be arranged along a circumferential direction.

In the second and third embodiments, the transparent plate is provided in the housing so that the portion where the drive-side rotor and the magnetic member face each other is visible from outside. However, instead of the transparent plate, a cutout may be formed in the housing. Alternatively, in the fourth embodiment, the cutout is formed in the turntable so as to expose the portion where the drive-side rotor and the magnetic member face each other. However, at least a part of the turntable may be a transparent plate.

What is claimed is:

1. A record player comprising:
   a turntable on which a record is placed;
   a drive motor generating a driving force to rotate the turntable; and
   a non-contact transmission mechanism transmitting the driving force of the drive motor to the turntable in a non-contact manner by a magnetic force,
   the non-contact transmission mechanism including:
   a drive-side rotor having a permanent magnet that generates the magnetic force and being rotated by the driving force of the drive motor; and
   a magnetic member provided on an entire circumference of an outer peripheral portion of the turntable in a state of partially opposing the permanent magnet, so that an attraction force due to the magnetic force from the permanent magnet acts on the magnetic member, the magnetic member being constituted of a soft magnetic body which is magnetized only while in a magnetic field of the permanent magnet and has no magnetic force after leaving the magnetic field,
   wherein the turntable is rotated according to the rotation of the drive-side rotor by the attraction force acting on the magnetic member from the permanent magnet.

2. The record player according to claim 1, wherein
   the permanent magnet has N poles and S poles which are alternately arranged in the circumferential direction at equal intervals on the drive-side rotor, and
   the magnetic member is constituted by alternately arranging first portions and second portions at equal intervals in the circumferential direction on the turntable, the influence of the magnetic force from the permanent magnet is relatively larger to the first portion than to the second portion.

3. The record player according to claim 2, wherein
   the first portion is a projection portion projecting from the magnetic member toward the permanent magnet where the magnetic member and the permanent magnet are facing,
   the second portion is a recessed portion recessed in the direction in which the distance from the magnetic member to the permanent magnet becomes greater than that at the projection portion, and
   an interval of each of the projection portions of the magnetic member is defined so that one of the two adjacent projection portions sandwiching one of the recessed portions faces the N pole and the other faces the S pole adjacent to the N pole where the magnetic member and the permanent magnet are facing.

4. The record player according to claim 2, wherein
   the magnetic member is an annular body formed along an outer circumference of the turntable and having a plurality of opening portions at equal intervals in the circumferential direction,
   the second portion is an opening portion and the first portion is a peripheral surface portion connecting the adjacent opening portions in the annular body, and
   an interval of each of the peripheral surface portions of the annular body is defined so that each one of the two adjacent peripheral surface portions sandwiching one of the opening portions faces the border of the N pole and the S pole where the magnetic member and the permanent magnet are facing.

5. The record player according to claim 1, wherein
   the magnetic member is provided on a side face of the outer peripheral portion of the turntable which is parallel to a rotation axis of the turntable,
   the permanent magnet is provided on a side face of the outer peripheral portion of the drive-side rotor which is parallel to a rotation axis of the drive-side rotor, and
   the turntable and the drive-side rotor are arranged with their respective rotation axes in a parallel state and their side faces opposed to each other.

6. The record player according to claim 1, wherein
   the magnetic member is provided on a plane of the outer peripheral portion of the turntable which is perpendicular to a rotation axis of the turntable,
   the permanent magnet is provided on a plane of the outer peripheral portion of the drive-side rotor which is perpendicular to a rotation axis of the drive-side rotor, and
   the turntable and the drive-side rotor are arranged with their respective rotation axes in a parallel state and their planes opposed to each other.

7. The record player according to claim 1, wherein the soft magnetic body is electromagnetic pure iron or ferrosilicon.

8. The record player according to claim 1, further comprising a housing to which the turntable and the drive-side rotor are rotatably mounted.

9. The record player according to claim 8, wherein the drive-side rotor is arranged on a rear side from the rotation axis of the turntable as viewed from a front face of the housing.

10. The record player according to claim 9, wherein
    a tone arm is arranged on a side from the turntable in the housing, and
    the drive-side rotor is arranged on the opposite side to the tone arm across the turntable.

11. The record player according to claim 10, wherein
    a lower portion of the turntable is embedded inside the housing,
    the magnetic member is provided on the lower portion,
    the drive-side rotor is arranged in the housing so as to face the lower portion, and
    the housing is provided with a transparent plate through which a portion where the drive-side rotor and the magnetic member face each other is visually recognized.

12. The record player according to claim 8, further comprising a shielding member which covers the periphery of the drive-side rotor and shields the magnetic force.

* * * * *